United States Patent
Ding et al.

(10) Patent No.: US 10,285,187 B2
(45) Date of Patent: May 7, 2019

(54) METHODS AND APPARATUS FOR MULTIPLE USER UPLINK

(71) Applicant: QUALCOMM Incorporated, San Diego, CA (US)

(72) Inventors: Gang Ding, San Diego, CA (US); Simone Merlin, San Diego, CA (US); Alfred Asterjadhi, San Diego, CA (US); George Cherian, San Diego, CA (US); Gwendolyn Denise Barriac, Encinitas, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 15/145,729

(22) Filed: May 3, 2016

(65) Prior Publication Data

US 2016/0330755 A1 Nov. 10, 2016

Related U.S. Application Data

(60) Provisional application No. 62/157,307, filed on May 5, 2015.

(51) Int. Cl.
| | | |
|---|---|---|
| *H04W 24/08* | (2009.01) | |
| *H04W 72/12* | (2009.01) | |
| *H04W 74/04* | (2009.01) | |
| *H04W 52/02* | (2009.01) | |

(52) U.S. Cl.
CPC ..... *H04W 72/121* (2013.01); *H04W 52/0216* (2013.01); *H04W 72/1226* (2013.01); *H04W 72/1284* (2013.01); *H04W 72/1289* (2013.01); *H04W 74/04* (2013.01); *Y02D 70/1222* (2018.01); *Y02D 70/1262* (2018.01); *Y02D 70/142* (2018.01)

(58) Field of Classification Search
CPC ........... H04W 72/121; H04W 72/1226; H04W 72/1284; H04W 52/0216
See application file for complete search history.

(56) References Cited

U.S. PATENT DOCUMENTS

| | | | | |
|---|---|---|---|---|
| 8,886,755 | B1 * | 11/2014 | Liu | H04W 74/04 709/218 |
| 2014/0269544 | A1 | 9/2014 | Zhu et al. | |
| 2015/0063111 | A1 * | 3/2015 | Merlin | H04L 47/12 370/235 |
| 2015/0319700 | A1 * | 11/2015 | Oteri | H04W 52/28 455/127.1 |
| 2017/0150520 | A1 * | 5/2017 | Soder | H04W 74/002 |

OTHER PUBLICATIONS

International Search Report and Written Opinion—PCT/US2016/030826—ISA/EPO—dated Aug. 1, 2016.

* cited by examiner

*Primary Examiner* — Lan-Huong Truong
(74) *Attorney, Agent, or Firm* — Paradice and Li LLP

(57) ABSTRACT

Systems and methods are disclosed that may provide for selective multi-user uplink (UL) of data for wireless devices. For example, a first wireless device may request permission to initiate a UL transmission to a second wireless device. The first wireless device may then receive, from the second wireless device, permission to initiate the UL transmission according to a multi-user (MU) UL protocol, determine a threshold duration for the UL transmission, and transmit UL data to the second wireless device according to the MU UL protocol and the threshold duration.

19 Claims, 19 Drawing Sheets

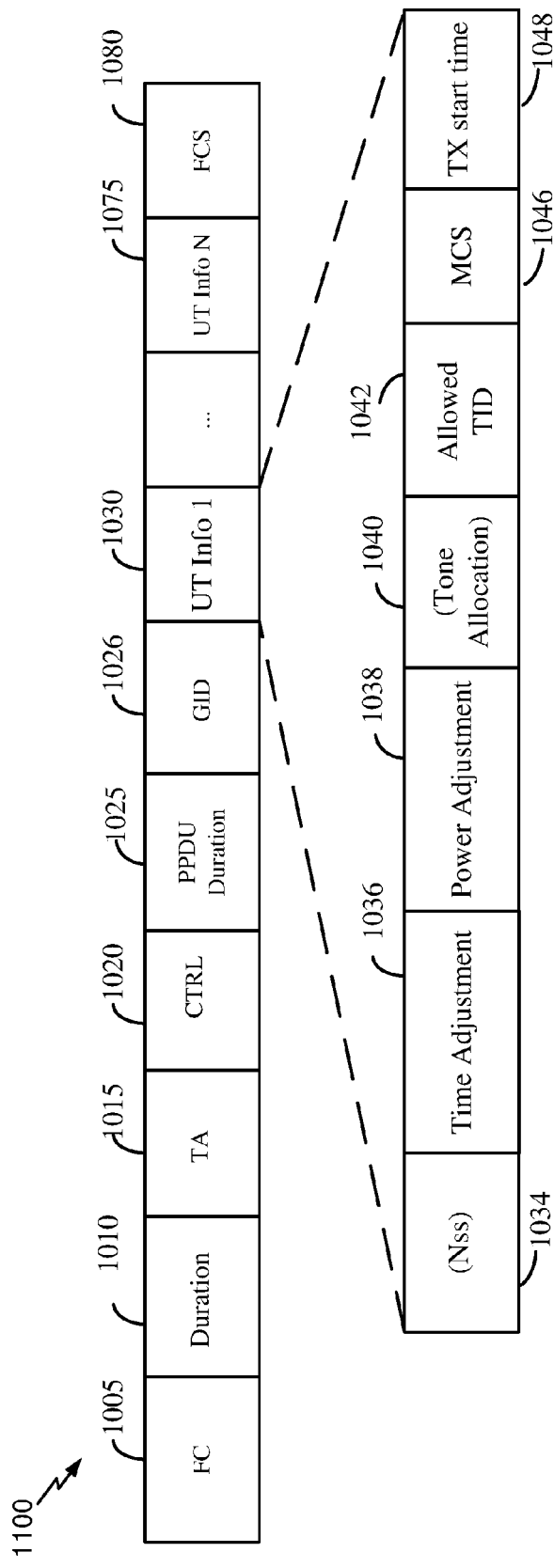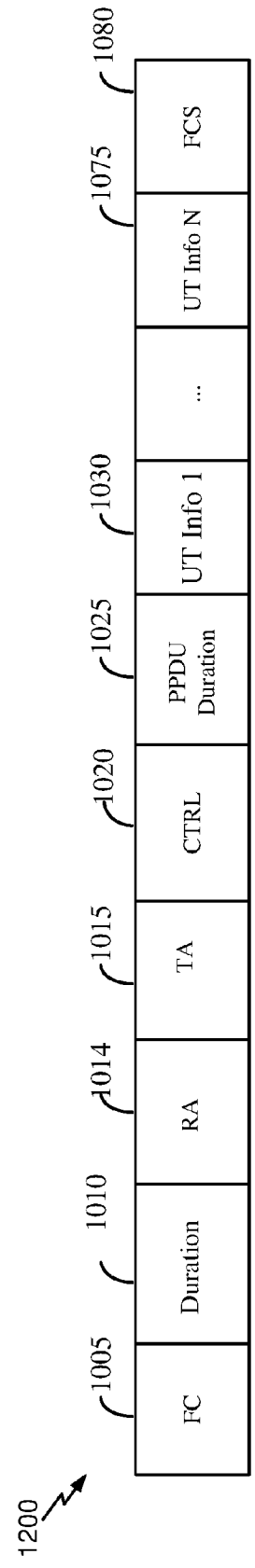
FIG. 11
FIG. 12

METHODS AND APPARATUS FOR MULTIPLE USER UPLINK

RELATED APPLICATION

This application claims priority to U.S. Provisional Patent Application No. 62/157,307, titled "Methods and Apparatus for Multiple User Uplink," filed May 5, 2015, which is hereby incorporated by reference in its entirety.

TECHNICAL FIELD

Certain aspects of the present disclosure generally relate to wireless communications, and more particularly, to methods and apparatus for multiple user uplink communication in a wireless network.

BACKGROUND OF RELATED ART

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are preferable for mobile devices that have dynamic connectivity needs and/or ad hoc (e.g., rather than fixed topology) network architectures. Wireless networks employ intangible physical media in an unguided propagation mode using electromagnetic waves (e.g., radio, microwave, infra-red, optical, etc.). Thus, wireless networks may facilitate user mobility and rapid field deployment.

To satisfy increasing bandwidth demands for wireless communications systems, some communication schemes may allow multiple user terminals to communicate with a single access point using shared channel resources while maintaining high data throughput. Given limited communication resources, it may be desirable to reduce the amount of traffic passing between the access point and the multiple terminals.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Apparatus and methods are disclosed that may allow for selective multi-user uplink (UL) of data in wireless devices. In one example, a method for selective multi-user uplink (UL) is disclosed. The method may include determining a presence of data for UL to a second wireless device, requesting permission to send a UL transmission tot the second wireless device, receiving, from the second wireless device, permission to send the UL transmission according to a multi-user (MU) UL protocol, determining a requested duration for the UL transmission, transmitting at least a portion of the data to the second wireless device according to the MU UL protocol, and receiving an acknowledgment of the UL transmission.

In another example, a first wireless device is disclosed. The first wireless device may include one or more processors, one or more transceivers, and a memory storing instructions that, when executed by the one or more processors, cause the first wireless device to transmit UL data to a second wireless device in a selective multi-user UL by performing operations comprising determining a presence of data for UL to a second wireless device, requesting permission to send a UL transmission tot the second wireless device, receiving, from the second wireless device, permission to send the UL transmission according to a multi-user (MU) UL protocol, determining a requested duration for the UL transmission, transmitting at least a portion of the data to the second wireless device according to the MU UL protocol, and receiving an acknowledgment of the UL transmission.

In another example, a first wireless device for transmitting UL data to a second wireless device in a selective multi-user UL is disclosed. The first wireless device may include means for determining a presence of data for UL to a second wireless device, means for requesting permission to send a UL transmission tot the second wireless device, means for receiving, from the second wireless device, permission to send the UL transmission according to a multi-user (MU) UL protocol, means for determining a requested duration for the UL transmission, means for transmitting at least a portion of the data to the second wireless device according to the MU UL protocol, and means for receiving an acknowledgment of the UL transmission.

BRIEF DESCRIPTION OF THE DRAWINGS

FIG. 11 shows a diagram of another embodiment of a clear to transmit frame.

FIG. 12 shows a diagram of another embodiment of a clear to transmit frame.

DETAILED DESCRIPTION

Figure 1:
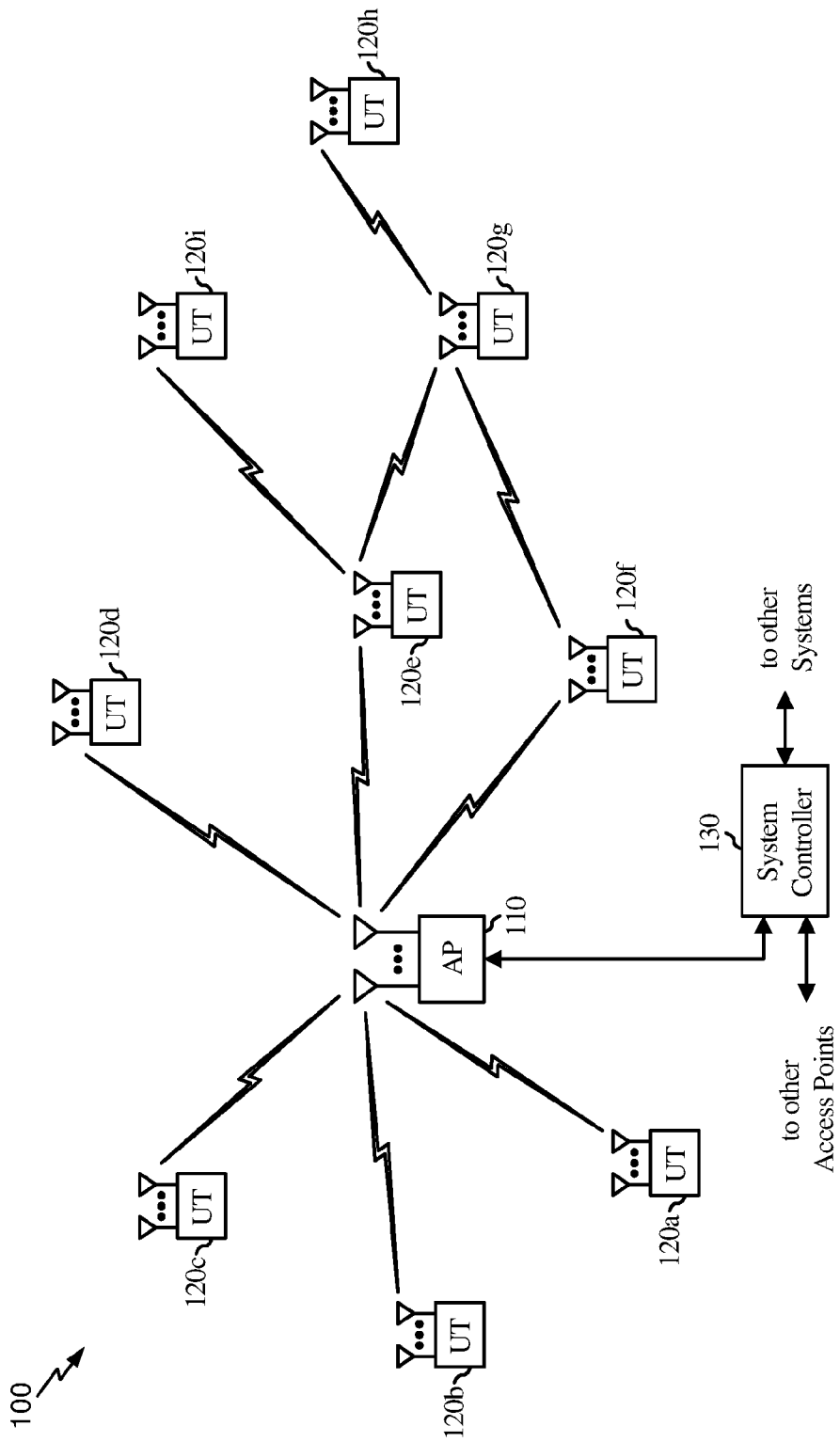
FIG. 1 illustrates a multiple-access multiple-input multiple-output system with access points and user terminals.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect wireless devices using well-known networking protocols. The embodiments described herein may apply to various communication techniques, such as Wi-Fi or, more generally, any wireless protocol defined by the IEEE 802.11 standard.

In some aspects, wireless signals may be transmitted according to a high-efficiency wireless (HEW) protocol (e.g., as defined by the IEEE 802.11ax specification) using orthogonal frequency-division multiplexing (OFDM), direct-sequence spread spectrum (DSSS) communications, a combination of OFDM and DSSS communications, or other schemes. Implementations of the HEW protocol may be used for Internet access, sensors, metering, smart grid networks, or other wireless applications. Wireless communications according to the HEW protocol may consume less power and/or may be more robust against signal interference (e.g., caused by objects such as humans) than wireless communications according to other wireless protocols.

In some implementations, a WLAN may include various component devices such as, for example, access points ("APs") and wireless stations ("STAs"). In general, an AP serves as a hub or base station for the WLAN and a STA serves as a client of the WLAN. For example, a STA may be a laptop computer, a personal digital assistant (PDA), a mobile phone, etc. In an example, a STA connects to an AP via a wireless link (e.g., in accordance with the IEEE 802.11 standard) to obtain general connectivity to the Internet and/or other wide area networks. In some implementations a STA may also operate as a software-enable AP ("SoftAP").

The techniques described herein may be used for various broadband wireless communication systems, including communication systems that are based on an orthogonal multiplexing scheme. Examples of such communication systems include Space Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may leverage the spatial locations of user terminals to simultaneously transmit data to multiple user terminals. A TDMA system may allow multiple user terminals to share the same frequency channel by dividing a communication interval into multiple time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 wireless protocols or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, OFDM symbols are signaled in the frequency domain and SC-FDMA symbols are signaled in the time domain. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver Radio Base Station ("RBS"), or some other terminology. An AP may correspond to a Basic Service Set (BSS), and two or more APs may correspond to an Extended Service Set (ESS)

A station "STA" may also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 is a diagram that illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or other similar terminology. A user terminal or STA may be fixed or mobile and may also be referred to as a mobile station or a wireless device, or other similar terminology. The access point 110 may communicate with one or more user terminals 120 at any given moment on via downlink channels and/or uplink channels. The downlink (e.g., forward link) represents the communication link from the access point to the user terminals, and the uplink (e.g., reverse link) represents the communication link from the user terminals to the access point. A user terminal may also communicate with another user terminal using peer-to-peer communication techniques. A system controller 130 couples to and provides coordination and control for the access point 110 and/or other access points in the system 100 (not shown for simplicity).

The example embodiments recognize that one or more of the user terminals 120 may not support SDMA signaling techniques. Thus, for some embodiments, the AP 110 may be configured to communicate with both SDMA and non-SDMA user terminals. This approach may conveniently allow older versions of user terminals ("legacy" stations) that do not support SDMA to remain deployed in an enterprise, extending their useful lifetime, while allowing newer SDMA user terminals to be introduced as deemed appropriate.

In example embodiments, the access point 110 may include a number ($N_{ap}$) of antennas to facilitate multiple-input (MI) downlink transmissions and multiple-output (MO) uplink transmissions for the system 100. A set (K) of selected user terminals 120 may collectively provide multiple-output downlink transmissions and multiple-input uplink transmissions for the system 100. For SDMA communications, the number of antennas on the access point 110 may be greater than or equal to the number of selected user terminals 120 (e.g., $N_{ap} \geq K \geq 1$) when the data streams for the K user terminals are not multiplexed in code, frequency, or time. The number of selected user terminals 120 may be greater than the number of antennas on the access point 110 (e.g., $K > N_{ap}$) when the data streams are multiplexed (e.g., using TDMA, CDMA, OFDMA, and/or other multiple-access signaling techniques). Each selected user terminal 120 may transmit user-specific data to and/or receive user-specific data from the access point. In general, each selected user terminal 120 may include a number ($N_{ut}$) of antennas. In some aspects, at least some of the selected user terminals may have different numbers of antennas.

The SDMA system 100 may be a time division duplex (TDD) system or a frequency division duplex (FDD) system. For a TDD system, downlink and uplink communications may operate on the same frequency band. For an FDD system, downlink and uplink communications may operate on different frequency bands. In some aspects, the MIMO system 100 may utilize a single carrier or multiple carriers for transmission. Still further, in some aspects, the system 100 may implement TDMA signaling techniques.

Figure 2:
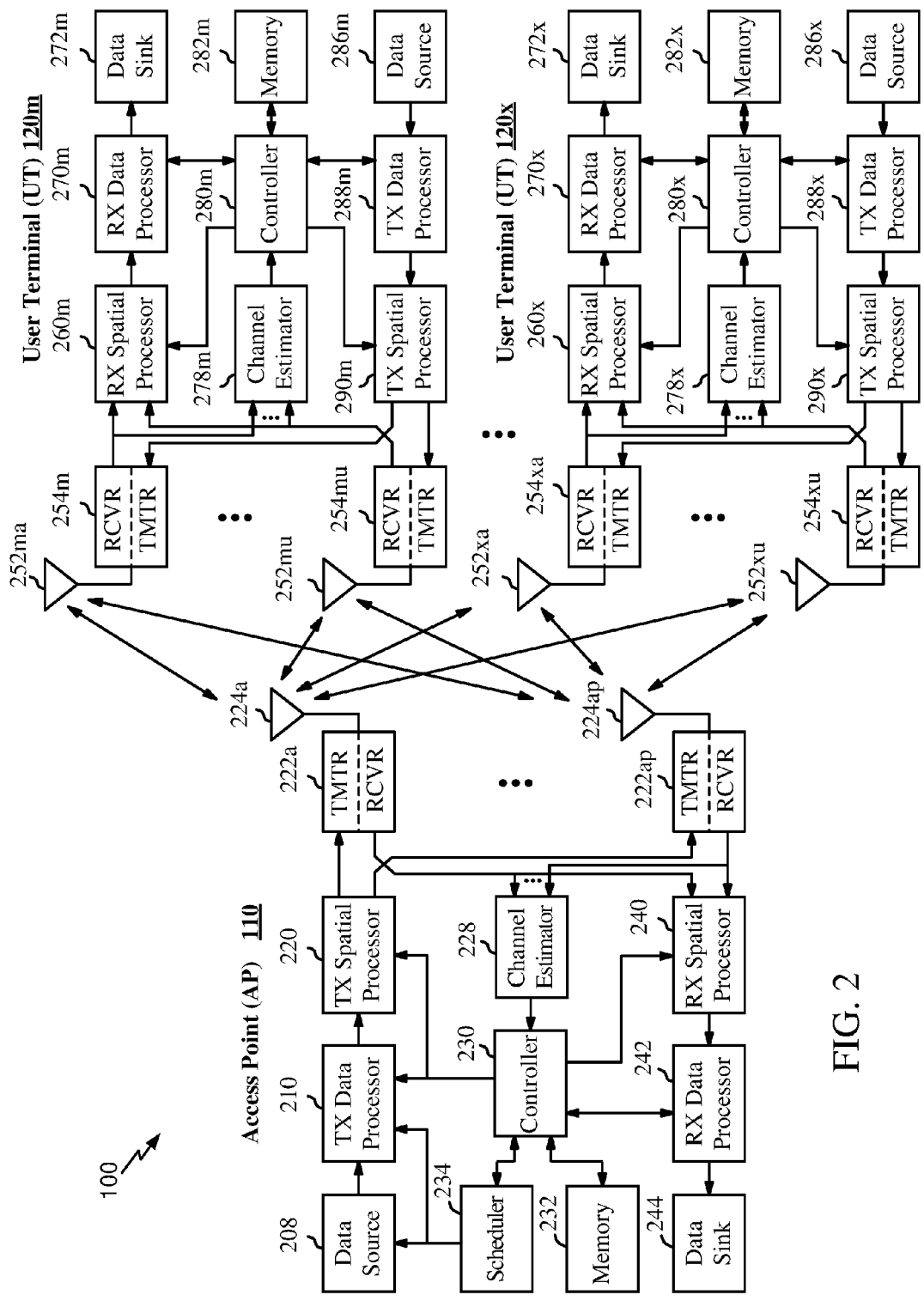
FIG. 2 illustrates a block diagram of the access point 110 and two user terminals 120$m$ and 120$x$ in a multiple-input multiple-output system.

FIG. 2 illustrates a block diagram of the access point 110 and two user terminals 120m and 120x of MIMO system 100. The access point 110 includes a number ($N_t$) of antennas 224a through 224ap. The user terminal 120m includes a number ($N_{ut,m}$) of antennas $252_{ma}$ through $252_{mu}$, and the user terminal 120x includes a number ($N_{ut,x}$) of antennas $252_{xa}$ through $252_{xu}$. The access point 110 may be a transmitting entity for downlink communications and a receiving entity for uplink communications. The user terminal 120 may be a transmitting entity for uplink communications and a receiving entity for downlink communications. As used herein, a "transmitting entity" may refer to an apparatus or device capable of transmitting data via a wireless channel, and a "receiving entity" may refer to an apparatus or device capable of receiving data via a wireless channel. In the following description, the subscript "dn" denotes the downlink and the subscript "up" denotes the uplink. For example, a number ($N_{up}$) of user terminals may be selected for simultaneous transmission on the uplink and a number ($N_{dn}$) of user terminals may be selected for simultaneous transmission on the downlink. The number of user terminals selected for uplink transmissions may or may not be equal to the number of user terminals selected for downlink transmissions. In some aspects, the access point 110 and/or the user terminal 120 may use beam-steering and/or other spatial processing techniques to communicate wireless signals.

Each user terminal 120 selected for uplink transmission includes a TX data processor 288 that receives traffic data from a data source 286 and control data from a controller 280. The TX data processor 288 processes (e.g., encodes, interleaves, and modulates) the traffic data for the user terminal 120 based on the coding and modulation schemes selected for the user terminal and generates a stream of data symbols. A TX spatial processor 290 performs spatial processing to convert the data symbol stream to a number ($N_{ut,m}$) of transmit symbol streams to be transmitted via the $N_{ut,m}$ antennas. Each transmitter unit ("TMTR") 254 receives and processes (e.g., converts to analog, amplifies, filters, and frequency upconverts) a respective transmit symbol stream to generate an uplink signal. The transmitter units 254 may output the uplink signals for transmission via the $N_{ut,m}$ antennas 252.

As described above, the $N_{up}$ user terminals 120 may be scheduled for simultaneous uplink transmissions. Each of these user terminals 120 may perform spatial processing on its respective data symbol stream and transmit its respective set of transmit symbol streams, via an uplink channel, to the access point 110.

At the access point 110, antennas 224a through 224ap may receive the uplink signals from the $N_{up}$ user terminals. Each antenna 224 provides a received signal to a respective receiver unit ("RCVR") 222. Each receiver unit 222 performs processing complementary to that performed by transmitter unit 254 to recover a received symbol stream. An RX spatial processor 240 performs receiver spatial processing on the received symbol streams from the receiver units 222 to generate uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal 120. An RX data processor 242 processes (e.g., demodulates, deinterleaves, and decodes) each recovered uplink data symbol stream based on the modulation and coding scheme used for that stream to obtain decoded data. The decoded data for each user terminal may be provided to a data sink 244 for storage and/or a controller 230 for further processing.

The access point 110 further includes a TX data processor 210 to receive data from a data source 208, control data from a controller 230, and/or additional data from a scheduler 234. The various types of data may be sent on different transport channels. TX data processor 210 processes (e.g., encodes, interleaves, and modulates) the data for each user terminal 120 based on the modulation and coding scheme selected for that user terminal. The TX data processor 210 may provide a respective downlink data symbol stream for each of the Nan user terminals. A TX spatial processor 220 performs spatial processing (such as a precoding or beamforming) to convert the downlink data symbol streams to a number ($N_{up}$) if transmit symbol streams to be transmitted via the $N_{up}$ antennas. Each transmitter unit 222 receives and processes a respective transmit symbol stream to generate a downlink signal. The transmitter units 222 may provide the downlink signals for transmission from via the $N_{up}$ antennas 224, for example to transmit to the user terminals 120.

At each user terminal 120, antennas 252 may receive the downlink signals from the access point 110. Each receiver unit 254 processes a received signal from an associated antenna 252 to recover a received symbol stream. An RX spatial processor 260 performs receiver spatial processing on the received symbol streams from the receiver units 254 to generate a downlink data symbol stream. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the user terminal 120.

A channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. The controller 280 for each user terminal may send feedback information (e.g., the downlink and/or uplink eigenvectors, eigenvalues, SNR estimates, and so on) to the access point 110. The controllers 230 and 280 may also control the operation of various processing units at the access point 110 and user terminal 120, respectively.

Figure 3:
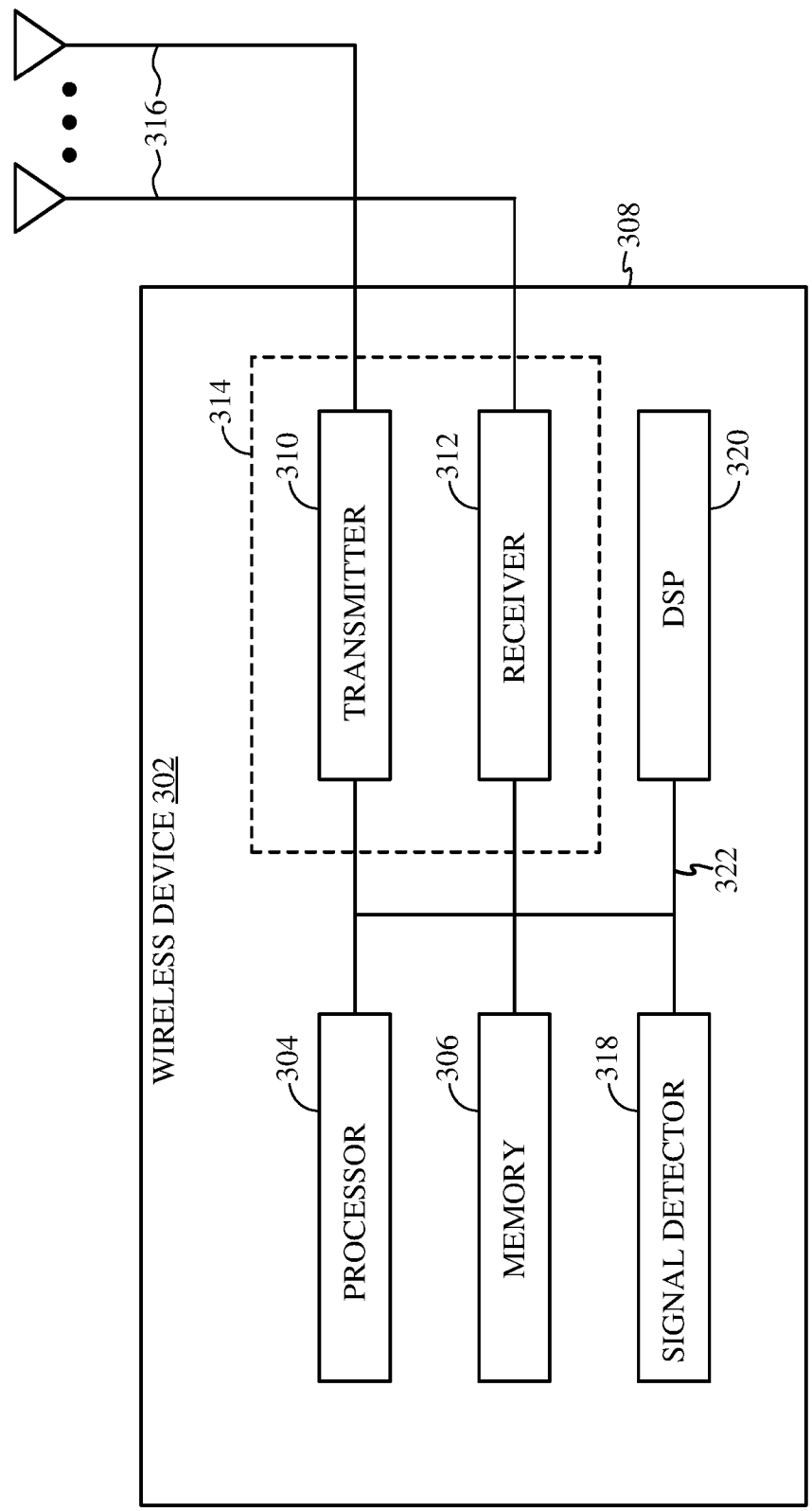
FIG. 3 illustrates various components that may be utilized in a wireless device that may be employed within a wireless communication system.

FIG. 3 illustrates various components that may be utilized in a wireless device 302 that may be employed within the wireless communication system 100. The wireless device 302 may be an example embodiment of the access point 110 or the user terminal 120 of FIG. 1.

The wireless device 302 may include a processor 304 which controls operations of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transceiver antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Certain aspects of the present disclosure support transmitting an uplink (UL) signal from multiple UTs to an AP. In some embodiments, the UL signal may be transmitted in a multi-user MIMO (MU-MIMO) system. Alternatively, the UL signal may be transmitted in a multi-user FDMA (MU-FDMA) or similar FDMA system. Specifically, FIGS. 4-8 illustrate uplink MU-MIMO (UL-MU-MIMO) transmissions 410A and 410B that would apply equally to UL-FDMA transmissions. In these embodiments, UL-MU-MIMO or UL-FDMA transmissions can be sent simultaneously from multiple STAs to an AP and may create efficiencies in wireless communication.

An increasing number of wireless and mobile devices put increasing stress on bandwidth requirements that are demanded for wireless communications systems. With limited communication resources, it may be desirable to reduce the amount of traffic passing between the AP and the multiple STAs. For example, when multiple terminals send uplink communications to the access point, it may be desirable to minimize the amount of time required to complete the uplink of all transmissions.

Figure 4:
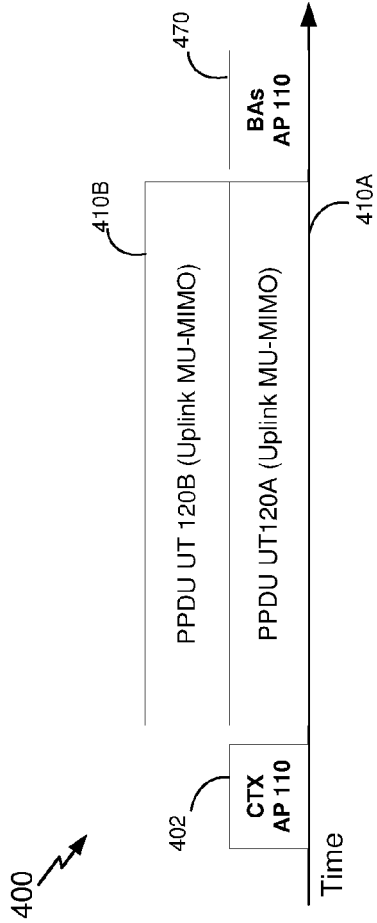
FIG. 4 shows a time diagram of an example frame exchange of an uplink multi-user multiple-input multiple-output communication.

FIG. 4 is a time sequence diagram 400 showing an example of an UL-MU-MIMO protocol 400 that may be used for UL communications. As shown in FIG. 4, with reference to FIG. 1, the AP 110 may transmit a clear to transmit (CTX) message 402 to the user terminals 120 indicating which user terminals 120 may participate in a particular UL-MU-MIMO TXOP. In some embodiments, the CTX message 402 may be transmitted in a payload portion of a physical layer convergence protocol (PLOP) protocol data units (PPDUs). An example of a CTX frame structure is described in greater detail below with reference to FIG. 10.

When a user terminal (UT) 120 receives a CTX message 402 from the AP 110 (e.g., indicating that the user terminal 120 may participate in the next UL-MU-MIMO TXOP), the user terminal 120 may initiate a UL-MU-MIMO transmission 410. As shown in FIG. 4A, UT 120A and UT 120B may perform UL-MU-MIMO transmissions 410A and 410B, respectively. The UL-MU-MIMO transmissions 410 and 410B may comprise physical layer convergence protocol (PLOP) protocol data units (PPDUs). Upon receiving the UL-MU-MIMO transmissions 410A and 410B, the AP 110 may transmit block acknowledgments (BAs) 470 to the user terminals 120A and 120B.

Not all APs 110 or user terminals 120 may support UL-MU-MIMO or UL-FDMA operation. A capability indication from a user terminal 120 may be indicated in a high efficiency wireless (HEW) capability element that is included in an association request or probe request (not shown for simplicity). For example, the HEW capability element may include a bit indicating UL-MU-MIMO and/or UL-FDMA capability, the maximum number of spatial streams a user terminal 120 can use in a UL-MU-MIMO transmission, the frequencies a user terminal 120 can use in a UL-FDMA transmission, the minimum and maximum power and granularity in the power backoff, and the minimum and maximum time adjustment a user terminal 120 can perform.

A capability indication from an AP 110 may be indicated in a HEW capability element that is included in an association response, beacon or probe response (not shown for simplicity). For example, the HEW capability element may include a bit indicating UL-MU-MIMO and/or UL-FDMA capability, the maximum number of spatial streams a single user terminal 120 can use in a UL-MU-MIMO transmission, the frequencies a single user terminal 120 can use in a UL-FDMA transmission, the required power control granularity, and the required minimum and maximum time adjustment a user terminal 120 should be able to perform.

In one embodiment, capable user terminals 120 may request to a capable AP to take part in the UL-MU-MIMO (or UL-FDMA) TXOP. The request may be included in a management frame, a request to send (RTS) message, a quality of service (QoS) frame, a power save (PS) poll, or an RTX frame. In one aspect, an AP 110 may respond by granting the user terminal 120 the use of the UL-MU-MIMO feature or the AP 110 may deny the user terminal's 120 request. The AP 110 may grant the use of the UL-MU-MIMO and the user terminal 120 may expect a CTX message 402 at a variety of times. Additionally, once a user terminal 120 is enabled to take part in a UL-MU-MIMO TXOP, the user terminal 120 may be configured to operate in a particular mode. For example, the user terminal 120 and the AP 110 may support multiple operation modes and the AP 110 may indicate to the user terminal 120 which mode to use in a HEW capability element, a management frame, or in an operation element. In one aspect, a user terminal 120 may dynamically change its operation mode and parameters, for example, by sending a different operating element to the AP 110. In another aspect the AP 110 may dynamically switch its operation mode, for example, by sending an updated operating element or a management frame to the user terminal 120, or by sending the updated operating element or the updated management frame in a beacon. In another aspect, the operation mode may be determined by the AP 110 in the setup phase and may be determined per user terminal 120 or for a group of user terminals 120. In another aspect the operation mode may be specified per traffic identifier (TID).

In some operation modes of UL-MU-MIMO transmissions, a user terminal 120 may receive a CTX message from an AP 110 and immediately send a response to the AP 110. The response may be in the form of a clear to send (CTS) message or another type of message. In some examples, sending the CTS message may cause user terminals not participating in the UL-MU-MIMO TXOP to refrain from medium access during the UL-MU-MIMO TXOP. The requirement to send the CTS message may be indicated in the CTX message or the requirement may be indicated in the setup phase of the communication between the AP 110 and the user terminal 120.

Figure 5:
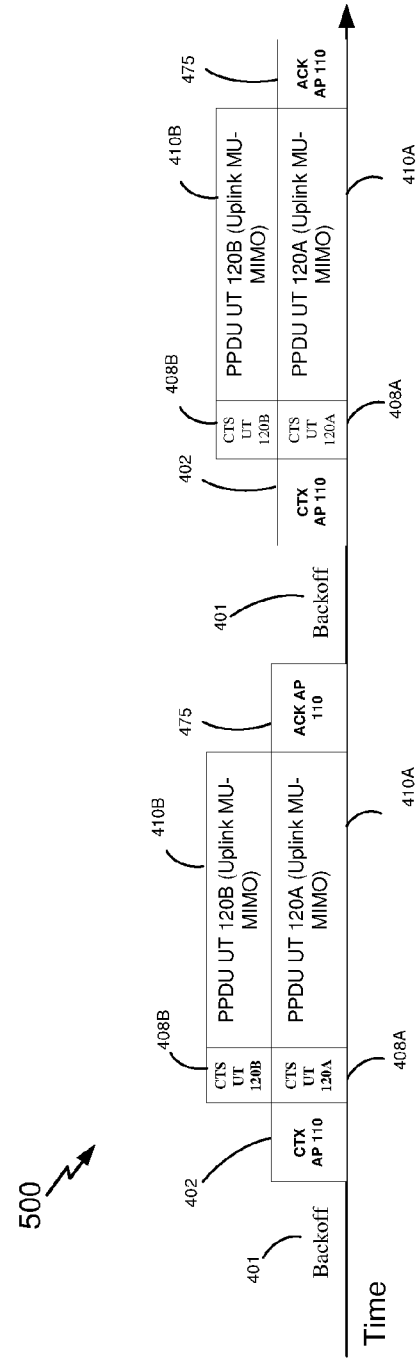
FIG. 5 shows a time sequence diagram of another example frame exchange of an uplink multi-user multiple-input multiple-output communication.

FIG. 5 is a time sequence diagram 500 that, in conjunction with FIG. 1, shows an example of an operation mode of UL-MU-MIMO transmissions between an AP 110 and user terminals 120A and 120B. As shown in FIG. 5, UT 120A may transmit a CTS message 408A and UT 120B may transmit a CTS message 408B in response to receiving the CTX message 402 from the AP 110. The modulation and coding scheme (MCS) of the CTS message 408A and the CTS message 408B may be based on the MCS of the CTX message 402. In an example embodiment, the CTS messages 408A and 408B may contain the same amount of bits and the same scrambling sequence so that they may be transmitted to the AP 110 at substantially the same time. A duration field of the CTS messages 408A and 408B may be based on a duration field in the CTX by removing the time for the CTX PPDU. The user terminal 120A may send an UL-MU-MIMO transmission 410A to the AP 110 according to the CTX message 402 and the user terminal 120B may also send an UL-MU-MIMO transmission 410B to the AP 110 according to the CTX message 402. The AP 110 may then send an acknowledgment (ACK) message 475 to the user terminals 120A and 120B. In some aspects, the ACK message 475 may include serial ACK messages sent to each user terminal 120 or the ACK message 475 may include BAs. In some aspects, the ACK messages 475 may be polled. Such an embodiment may improve transmission efficiency by enabling concurrent transmission of CTS messages 408 from multiple user terminals 120 to an AP 110), thereby saving time and reducing the occurrence and/or effects of interference.

Figure 6:
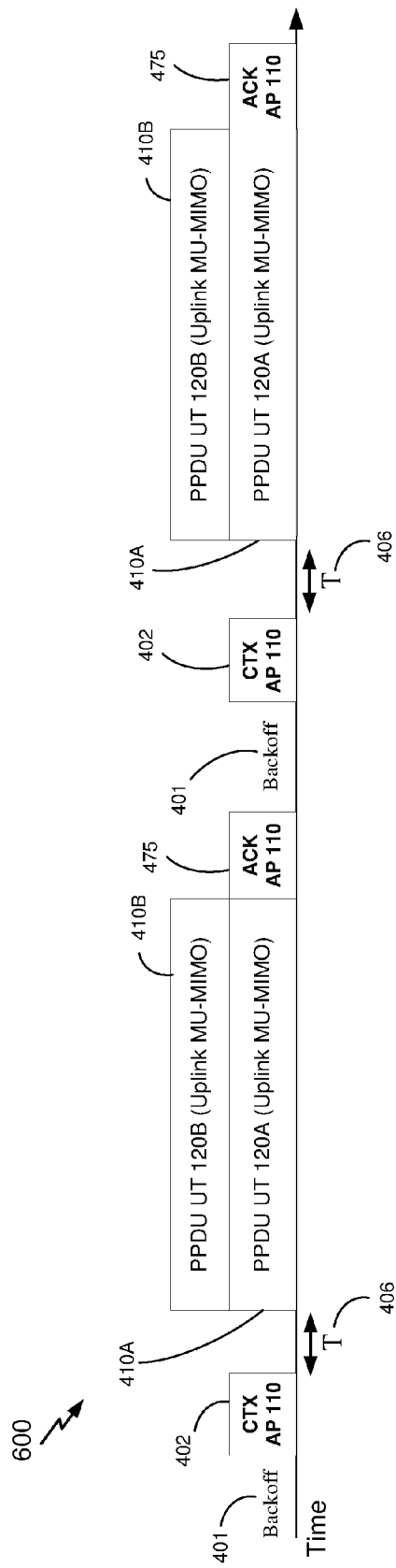
FIG. 6 shows a time sequence diagram of another example frame exchange of an uplink multi-user multiple-input multiple-output communication.

FIG. 6 is a time sequence diagram 600 that, in conjunction with FIG. 1, shows an example of an operation mode of UL-MU-MIMO transmissions. In this embodiment, user terminals 120A and 120B may receive a CTX message 402 from an AP 110. The CTX message 402 may indicate a time (T) 406, following the CTX message 402, after which the user terminals 120A and 120B may perform UL-MU-MIMO transmissions. The time 406 may be a short interframe space (SIFS), a point interframe space (PIFS), or another time. The time 406 may include time offsets as indicated by the AP 110 in the CTX message 402 or via a management frame. The SIFS and PIFS time may be fixed in a standard or may be indicated by the AP 110 in the CTX message 402 or in a management frame. The time 406 may improve synchronization between the AP110 and the user terminals 120A and 120B and may allow the user terminals 120A and 120B sufficient time to process the CTX message 402, and/or other messages, before initiating their UL-MU-MIMO transmissions.

In some circumstances, a user terminal 120 may have data to upload to the AP 110 but may not have received a CTX message 402 or another message indicating that the user terminal 120 may initiate an UL-MU-MIMO transmission. In one operation mode, the user terminals 120 may not transmit data outside of an UL-MU-MIMO transmission opportunity (TXOP) (e.g., indicated by the CTX message 402). In another operation mode, user terminals 120 may transmit frames to the AP 110 to request a UL-MU-MIMO TXOP and may then perform UL-MU-MIMO transmissions during the UL-MU-MIMO TXOP, for example, upon receiving a CTX message 402 from the AP 110. In one embodiment, a user terminal 120 may request a UL-MU-MIMO TXOP by transmitting a request to transmit (RTX) frame to the AP 110 (e.g., an example RTX frame structure is described in greater detail below with reference to FIGS. 8 and 9). In some embodiments, the user terminal 120 may not transmit outside of an UL-MU-MIMO TXOP, except to send an RTX frame to the AP 110.

In other embodiments, a frame sent by a user terminal 120 to request an UL-MU-MIMO TXOP may be any frame which indicates to an AP 110 that a user terminal 120 has data to send. The AP 110 and the user terminal 120 may determine (e.g., during setup) that such frames may indicate an UL-MU-MIMO TXOP request. For example, a user terminal 120 may indicate that it has data to send using one or more of the following: an RTS frame, a data frame or QoS Null set to indicate more data, and/or a PS poll message. In one embodiment, the user terminal 120 may not transmit outside an UL-MU-MIMO TXOP, except to send frames to trigger an UL-MU-MIMO TXOP (e.g., RTS, PS poll, or QOS null frames). In another embodiment, the user terminal 120 may indicate a request for an UL-MU-MIMO TXOP by setting bits in the QoS control frame of an uplink data packet.

Figure 7:
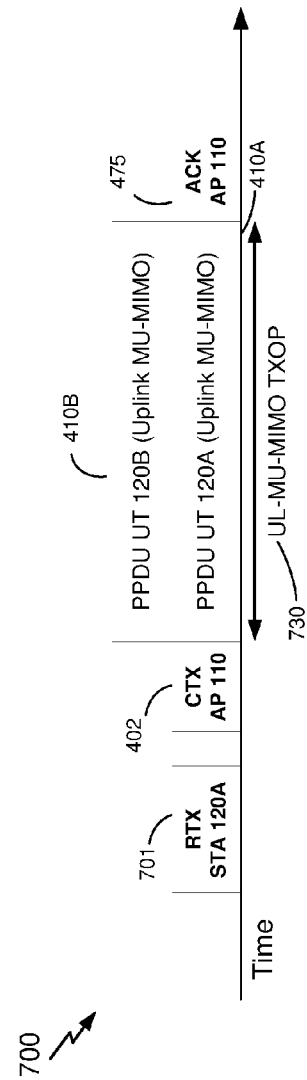
FIG. 7 shows a time sequence diagram of another example frame exchange of an uplink multi-user multiple-input multiple-output communication.

FIG. 7 is a time sequence diagram 700 showing, in conjunction with FIG. 1, an example of UL-MU-MIMO communications including a user terminal 120A sending an RTX message 701 to the AP 110 to request and initialize an UL-MU-MIMO TXOP. In this embodiment, the user terminal 120A may send an RTX message 701 to the AP 110 to request an UL-MU-MIMO TXOP. In other embodiments, an RTX message may be sent by the user terminal 120B. As shown in FIG. 7, the AP 110 may respond to the RTX message 701 with a CTX message 402 granting an UL-MU-MIMO TXOP 730 to the user terminal 120A. The CTX message 402 may also grant the UL-MU-MIMO TXOP 730 to the user terminal 120B. Upon receiving the CTX message 402, the user terminals 120A and 120B may initiate respective UL-MU-MIMO transmissions 410A and 410B (e.g., concurrently) to the AP 110. As described above, the user terminal 120A may maintain its UL-MU-MIMO transmission 410A for a duration indicated by the AP 110 in the CTX 402, and the user terminal 120B may similarly maintain its UL-MU-MIMO transmission 410B for the same or similar duration.

In another aspect, the AP 110 may respond to the RTX message 701 with a CTS message that grants a single-user (SU) UL TXOP. In another aspect, the AP 110 may respond to the RTX message 701 with a frame (e.g., ACK or CTX with a special indication) that acknowledges the reception of the RTX message 701 but does not grant an immediate UL-MU-MIMO TXOP. In another aspect, the AP 110 may respond to the RTX message 701 with a frame that acknowledges the reception of the RTX message 701, and grants a delayed UL-MU-MIMO TXOP. For example, the acknowledgement frame may specify the future start time and/or duration of the UL-MU-MIMO TXOP. In some embodiments, the AP 110 may send a CTX message 402 to signal start the UL-MU-MIMO TXOP at the designated time.

In another aspect, the AP 110 may respond to the RTX message 701 with an ACK or other response signal which does not grant the user terminal 120 an UL-MU-MIMO transmission but indicates that the user terminal 120 shall wait for a time (T) before attempting another transmission (e.g., sending another RTX message). In this aspect the time T may be indicated by the AP 110 in the setup phase or in the response signal. In another aspect, an AP 110 and a user terminal 120 may agree on a time which the user terminal 120 may transmit a RTX message 701, RTS, PS-poll, or any other request for a UL-MU-MIMO TXOP.

In another operation mode, user terminals 120 may transmit requests for UL-MU-MIMO transmissions 410 in accordance with well-known contention-based channel access protocols. The contention parameters for user terminals 120 implementing UL-MU-MIMO may be set to different values than for other user terminals that are not implementing UL-MU-MIMO. In this embodiment, the AP 110 may indicate the value of the contention parameters in a beacon, in an association response, or through a management frame. In another aspect, the AP 110 may provide a delay timer that prevents a user terminal 120 from transmitting for a certain amount of time after each successful UL-MU-MIMO TXOP or after each RTX, RTS, PS-poll, or QoS null frame. The timer may be restarted after each successful UL-MU-MIMO TXOP. The AP 110 may indicate the delay timer to user terminals 120 in the setup phase or in the CTX message 402. In some aspects, the delay timer may be different for each of the user terminals 120. For example, the delay timer may depend on the order of the user terminals 120 identified in the CTX message 402.

In another operational mode, the AP 110 may specify a time interval during which the user terminals 120 are allowed to perform UL-MU-MIMO transmissions. In one aspect, the AP 110 may indicate a time interval during which the user terminals 120 are allowed to send a RTX, RTS, or other message to the AP 110 to request an UL-MU-MIMO TXOP. In this aspect, the user terminals 120 may use well-known contention-based channel access protocols. In another aspect, the user terminals 120 may not initiate UL-MU-MIMO transmissions during the specified time interval, but rather the AP 110 may send a CTX or other message to the user terminals 120 to trigger the UL-MU-MIMO transmissions.

In certain embodiments, a user terminal 120 configured for UL-MU-MIMO may indicate to an AP 110 that it has pending uplink data to be transmitted. In one aspect, the user terminal 120 may send a RTS or a PS-poll to the AP 110 to request a UL-MU-MIMO TXOP. In another embodiment, the user terminal 120 may request an UL-MU-MIMO TXOP using a quality of service (QoS) null data frame, for example, where the bits 8-15 of the QoS control field indicate a non-empty queue. In this embodiment the user terminal 120 may determine during the setup phase which data frames (e.g., RTS, PS-poll, QoS null, etc.) may be used to request a UL-MU-MIMO TXOP when the bits 8-15 of the QoS control field indicate a non-empty queue. In one embodiment, the RTS, PS-poll, or QoS null frames may include a 1 bit indication allowing or disallowing the AP 110 to respond with a CTX message 402. In another embodiment, the QoS null frame may include TX power information and per-TID queue information. The TX power information and per-TID queue information may be inserted in the two bytes of the sequence control and QoS controls fields in a QoS null frame and the modified QoS null frame may be sent to the AP 110 to request a UL-MU-MIMO TXOP. In another embodiment, with reference to FIGS. 1 and 7, the user terminal 120 may send a RTX message 701 to request a UL-MU-MIMO TXOP.

As described above with reference to FIGS. 4-7, in response to receiving an RTS, RTX, PS-poll or QoS null frame, or other trigger frame, an AP 110 may send a CTX message 402 to at least the requesting user terminal 120. In one embodiment, after the transmission of the CTX message 402 and the completion of the UL-MU-MIMO transmissions 410A and 410B, control of the wireless medium may return to the user terminals 120A and 120B, which may decide how to use the remaining duration of the TXOP. In another embodiment, after the transmission of the CTX message 402 and the completion of the UL-MU-MIMO transmissions 410A and 410B, control of the wireless medium may return to the AP 110, and the AP110 may use the remaining duration of the TXOP for additional UL-MU-MIMO transmissions (e.g., by sending CTX messages 402 to user terminals 120A and 120B and/or other user terminals in the wireless network).

Figure 8:
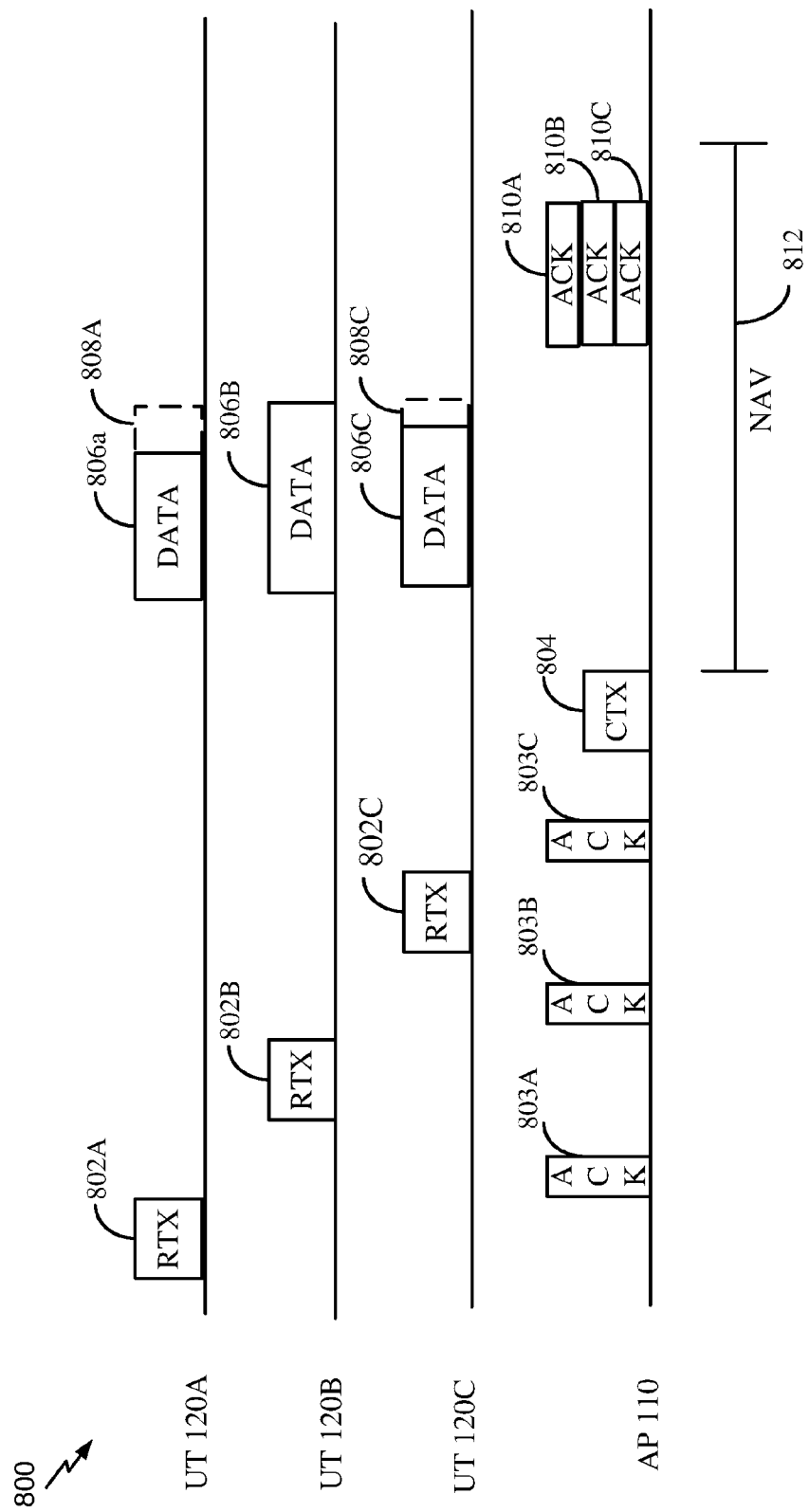
FIG. 8 shows a time sequence diagram of uplink multi-user multiple-input multiple-output communication.

FIG. 8 is a timing diagram 800 showing an example multi-user uplink communication. The timing diagram 800 shows an exchange of wireless messages between an AP 110 and three user terminals 120A-120C. During the message exchange, each of the user terminals 120A-120C may transmit a request-to-transmit (RTX) message 802A-802C to the AP 110. Each of the RTX messages 802A-802C may indicate that the transmitting user terminal 120A, 120B, or 120C has data available to be transmitted to the AP 110.

Upon receiving the RTX messages 802A-820C, the AP 110 may respond with a message indicating that the AP 110 has received each of the RTX messages 802A-802C from the user terminals 120A-120C. As shown in FIG. 8, the AP 110 may transmit ACK messages 803A-803C in response to each RTX messages 802A-802C. In some embodiments, the AP 110 may transmit a message (e.g., a CTX message) indicating that each of the RTX messages 802A-802C has been received, but a TXOP has not been granted for the requesting user terminals 120A-120C. In FIG. 8, after sending the last ACK message 803C, the AP 110 may transmit a CTX message 804. In some aspects, the CTX message 804 is transmitted to at least the user terminals 120A-120C. In some aspects, the CTX message 804 may be a broadcast message. The CTX message 804 may indicate which user terminals are granted permission to transmit data to the AP 110 during a TXOP. The CTX message 804 may also indicate a starting time and duration of the TXOP. For example, the CTX message 804 may indicate that the user terminals 120A-120C should set their network allocation vectors to be consistent with NAV 812.

At a time indicated by the CTX message 804, the three user terminals 120A-120C may transmit data 806A-806C to the AP 110. The data 806A-806C may be transmitted at least partially concurrently during the TXOP. In example embodiments, the user terminals 120A-120C may transmit their respective data 806A-806C using uplink multi-user multiple input, multiple output transmissions (UL-MU-MIMO) or uplink frequency division multiple access (UL-FDMA) signaling techniques.

In some aspects, user terminals 120A-120C may transmit "padded" data such that data transmissions by each user terminal, during a shared TXOP, are of equal or approximately equal duration. In the message exchange of FIG. 8, the user terminal 120A may transmit pad data 808A, the user terminal 120C may not transmit any pad data, and the user terminal 120C may transmit pad data 808c. The transmission of pad data ensures that each of the user terminals 120A-120C complete their respective transmissions at approximately the same time. This may provide for a more equalized transmission power over the duration of the TXOP, thereby optimizing AP 110 receiver efficiencies.

After the AP 110 receives the data transmissions 806A-806C from the user terminals 120A-120C, the AP 110 may transmit acknowledgment messages 810A-810C to each of the user terminals 120A-120C. In some aspects, the acknowledgment messages 810A-810C may be transmitted at least partially concurrently using either DL-MU-MIMO or DL-FDMA signaling techniques.

Figure 9:
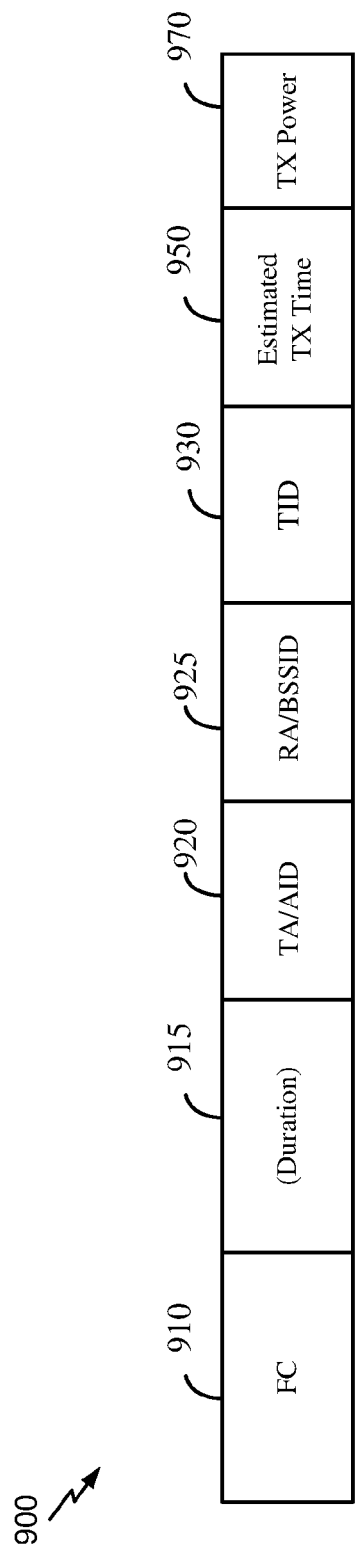
FIG. 9 shows a diagram of a request to transmit frame.

FIG. 9 shows an example embodiment of an RTX frame 900. The RTX frame 900 may include a frame control (FC) field 910, an optional duration field 915, a transmitter address/allocation identifier (TA/AID) field 920, a receiver address/basic service set identifier (RA/BSSID) field 925, a TID field 930, an estimated transmission (TX) time field 950, and a TX power field 970. The FC field 910 may indicate a control subtype or an extension subtype. The duration field 915 may indicate to any receiver of the RTX frame 900 to set the network allocation vector (NAV). In one aspect, the RTX frame 900 may not have a duration field 915. The TA/AID field 920 may indicate a source address, which may be an AID or a full MAC address. The RA/BSSID field 925 may indicate the RA or BSSID. In one aspect, the RTX frame 900 may not contain a RA/BSSID field 925. The TID field 930 may indicate an access category (AC) for which a user terminal has data. The estimated TX time field 950 may indicate a time requested for a UL-TXOP based on an amount of time required for a user terminal 120 to send all the data in its buffer at the current planned MCS. The TX power field 970 may indicate the power at which the RTX frame 900 is being transmitted and may be used by the AP 110 to estimate the link quality and adapt the power backoff indication in a CTX frame.

In some embodiments, before an UL-MU-MIMO communication can take place, an AP 110 may collect information from the user terminals 120 that are participating in the UL-MU-MIMO communication. The AP 110 may optimize the collection of information from the user terminals 120 by scheduling the UL transmissions from each of the user terminals 120.

Figure 10:
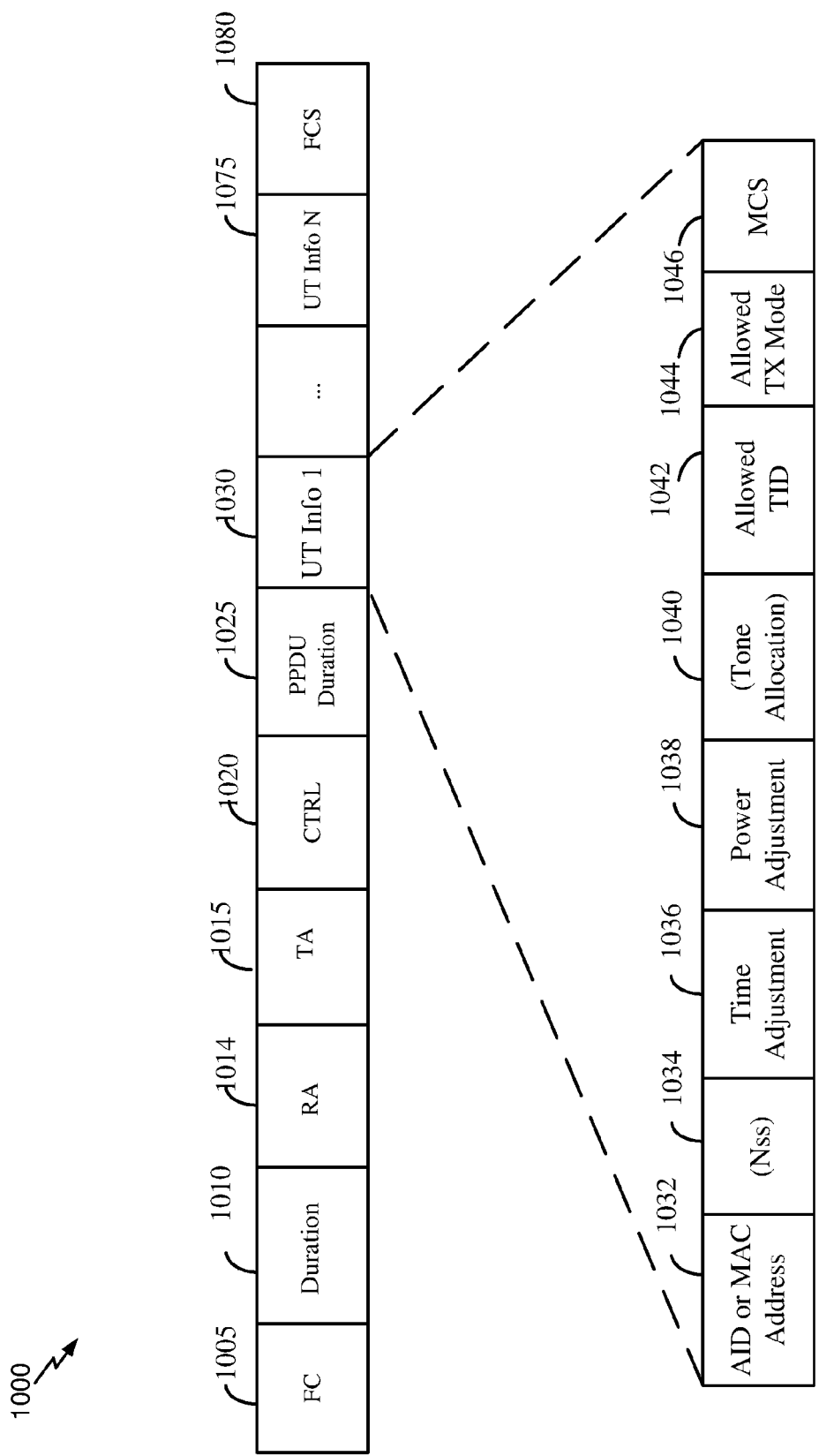
FIG. 10 shows a diagram of a clear to transmit frame.

As discussed above, the CTX message 402 may be used in a variety of communications. FIG. 10 is a diagram of an example of a CTX frame 1000 structure. In this embodiment, the CTX frame 1000 is a control frame that includes a frame control (FC) field 1005, a duration field 1010, a receiver address field 1014, a transmitter address (TA) field 1015, a control (CTRL) field 1020, a PPDU duration field 1025, a UT info field 1030, and a frame check sequence (FCS) field 1080. The FC field 1005 indicates a control subtype or an extension subtype. The duration field 1010 indicates to any receiver of the CTX frame 1000 to set the network allocation vector (NAV). In some embodiments the RA 1014 field identifies a group of UTs through a multicast MAC address. The TA field 1015 indicates the transmitter address or a BSSID. The CTRL field 1020 is a generic field that may include information regarding the format of the remaining portion of the frame (e.g., the number of UT info fields and the presence or absence of any subfields within a UT info field), indications for rate adaptation for the user terminals 120, indication of allowed TID, and indication that a CTS must be sent immediately following the CTX frame 1000. The CTRL field 1020 may also indicate if the CTX frame 1000 is being used for UL-MU-MIMO or for UL FDMA or both, indicating whether an Nss or Tone allocation field is present in the UT Info field 1030. Alternatively, the indication of whether the CTX is for UL-MU-MIMO or for UL FDMA can be based on the value of the subtype. In some aspects, UL-MU-MIMO and UL FDMA operations may be jointly performed by specifying to a UT both the spatial streams to be used and the channel to be used; in this case, the Nss indication is referred to a specific tone allocation. The PPDU duration 1025 field indicates the duration of the following UL-MU-MIMO PPDU that the user terminals 120 are allowed to send. The AP 110 may determine the duration of the following MU-MIMO PPDU that the user terminals 120 are allowed to send based on estimated TX time fields received in at least one RTX message from the user terminals 120.

The UT Info 1030 field contains information regarding a particular UT and may include a per-UT (per user terminal 120) set of information (see UT Info 1 1030 and UT Info N 1075). The UT Info 1030 field may include an AID or MAC address field 1032 which identifies a UT, a number of spatial streams field (Nss) 1034 field which indicates the number of spatial streams a UT may use (in an UL-MU-MIMO system), a Time Adjustment 1036 field which indicates a time that a UT should adjust its transmission compared to the reception of a trigger frame (the CTX in this case), a Power Adjustment 1038 field which indicates a power backoff a UT should take from a declared transmit power, a Tone Allocation 1040 field which indicates the tones or frequencies a UT may use (in a UL-FDMA system), an Allowed TID 1042 field which indicates the allowable TID, an Allowed TX Mode 1044 field which indicates the allowed TX modes, and a MCS 1046 field which indicates the MCS the UT should use. A user terminal 120 receiving a CTX with a Allowed TID 1042 indication may be allowed to transmit data only of that TID, data of the same or higher TID, data of the same or lower TID, any data, or only data of that TID first, then if no data is available, data of other TIDs. The FCS 1080 field indicates the carries an FCS value used for error detection of the CTX frame 1000.

FIG. 11 shows another example of a CTX frame 1100 structure. In this embodiment and in conjunction with FIG. 10, the UT Info 1030 field does not contain the AID or MAC Address 1032 field and instead the CTX frame 1000 includes a group identifier (GID) 1026 field which identifies the UTs by a group identifier rather than an individual identifier. FIG. 12 shows yet another example of a CTX frame 1200 structure. The CTX frame 1200 includes a RA 1014 field (e.g., in lieu of the GID 1026 field shown in FIG. 11) which identifies a group of UTs through a multicast MAC address.

Figure 13:
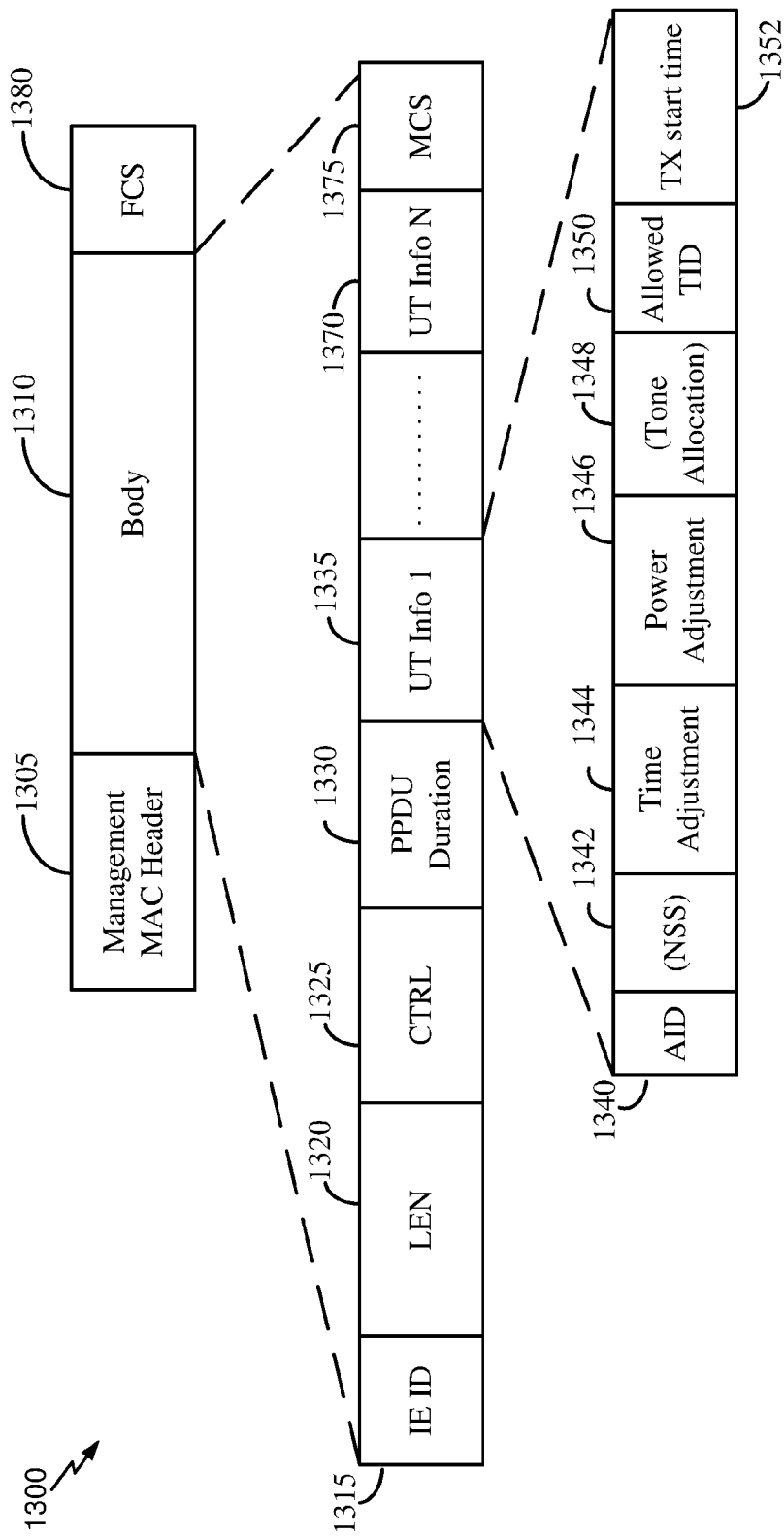
FIG. 13 shows a diagram of another embodiment of a clear to transmit frame.

FIG. 13 shows an example embodiment of a CTX frame 1300 structure. In this embodiment, the CTX frame 1300 is a management frame that includes a Management MAC Header 1305 field, a Body 1310 field, and a FCS 1380 field. The Body 1310 field includes an IE ID 1315 field which identifies an information element (IE), a LEN 1320 field which indicates the length of the CTX frame 1300, a CTRL 1325 field which includes the same information as the CTRL 1020 field, a PPDU Duration 1330 field which indicates the duration of the following UL-MU-MIMO PPDU that the user terminals 120 are allowed to send, a UT Info 1 1335 field and a MCS 1375 field which can indicate the MCS for all the UTs to use in the following UL-MU-MIMO transmission, or an MCS backoff for all the UTs to use in the following UL-MU-MIMO transmission.

The UT Info 1 1335 (along with UT Info N 1370) field represents a per-UT field that includes AID 1340 field which identifies a UT, a number of spatial streams field (Nss) 1342 field which indicates the number of spatial streams a UT may use (in an UL-MU-MIMO system), a Time Adjustment 1344 field which indicates a time that a UT should adjust its transmission compared to the reception of a trigger frame (the CTX in this case), a Power Adjustment 1348 field which indicates a power backoff a UT should take from a declared transmit power, a Tone Allocation 1348 field which indicates the tones or frequencies a UT may use (in a UL-FDMA system), an Allowed TID 1350 field which indicates the allowable TID, and a TX start time field 1048 which indicates a start time for the UT to transmit uplink data.

In one embodiment, the CTX frame 1000 or the CTX frame 1300 may be aggregated in an A-MPDU to account for a processing time of a user terminal 120 (e.g., before initiating uplink transmissions). In this embodiment, pad data may be added after the CTX frame to allow a user terminal 120 additional time to process the incoming packet. One benefit to padding a CTX frame may be to avoid possible contention issues for the UL transmissions from other user terminals 120 (e.g., compared to increasing the interframe space (IFS) as described above). In one aspect, the CTX frame may be a management frame, and may be transmitted with additional padding information elements (IEs). In another aspect, the CTX frame may be aggregated in an A-MPDU, and may include additional A-MPDU padding delimiters. Padding delimiters may be provided as end of frame (EoF) delimiters (e.g., 4 bytes) or other padding delimiters. In another aspect, the padding may be achieved by adding data, control, and/or Management MPDUs, as long as they do not need to be processed within an IFS response time. The MPDUs may include information indicating to the receiver that no immediate response is required and will not be required by any of the following MPDUs. In another aspect, the user terminals 120 may request a minimum duration or padding for the CTX frame. In another embodiment, the padding may be achieved by adding PHY OFDMA symbols, which may include undefined bits that do not carry information (e.g., or may include bit sequences that carry information, as long as the information does not need to be processed within the IFS time).

In some embodiments, the AP 110 may initiate a CTX transmission. In one embodiment, the AP 110 may send a CTX message 402 in accordance with regular enhanced distribution channel access (EDCA) contention protocol. In another embodiment, the AP 110 may send a CTX message 402 at scheduled times. For example, the scheduled times may be provided in a restricted access window (RAW) indication in a beacon frame broadcast by the AP 110 to the user terminals 120. The RAW indication may specify a time reserved for a group of user terminals 120 to access the medium, a target wake time (TWT) agreement with each user terminal 120 (e.g., which may indicate to multiple user terminals 120 to be awake at the same time to take part in a UL-MU-MIMO transmission), or information in other fields. Outside the RAW and/or TWT a user terminal 102 may be allowed to transmit any frame, or only a subset of frames (e.g., non-data frames). In some embodiments, the user terminal 102 may be prohibited from transmitting certain frames (e.g., data frames) outside the RAW and/or TWT. In some aspects, the user terminal 120 may indicate that it is in a sleep state. By scheduling CTX transmissions, multiple user terminals 120 may be allocated to the same TWT or the same RAW time.

Referring back to FIGS. 4-6, in conjunction with FIG. 1, the UL-MU-MIMO transmissions 410A and 410B may have the same duration. The user terminals 120 may plan to transmit data and may send a message (e.g., an RTX) to the AP 110 requesting to transmit their data. The AP 110 may send a message (e.g., CTX message 402) to the user terminals 120 indicating a target transmission duration for the UL-MU-MIMO transmissions 410A and 410B. In some aspects, the target transmission duration may be negotiated by the AP 110 and the user terminals 120 in the setup phase. The user terminal 120 may determine a planned transmission duration based on an amount of data to be transmitted (e.g., as planned data) and the operating and transmission parameters of the user terminal 120 (e.g., level of aggregation and MCS). The user terminal 120 may determine whether the planned transmission duration fits, exceeds, or falls shown of the target transmission duration. In some circumstances, the user terminal 120 may have planned data for transmission that, when transmitted, will have a planned transmission duration that fits (e.g., is equal to) the target transmission duration such that the user terminal 120 may transmit its data without modification. In other circumstances, the user terminal 120 may have planned data for transmission that, when transmitted, would have a planned transmission duration that exceeds the target transmission duration. In such circumstances the user terminal 120 may change the planned data or its operating and transmission parameters, for example, by decreasing the amount of planned data to be transmitted such that the planned transmission duration is within the target transmission duration. In other circumstances, the user terminal 120 may have planned data for transmission that, when transmitted, would have a planned transmission duration that falls short of the target transmission duration. In such circumstances the user terminal 120 may change the planned data or its operating or transmission parameters, for example, by increasing the amount of planned data to be transmitted such that the planned transmission duration is substantially equal to the target transmission duration.

In some aspects, the AP 110 may restrict the parameters that can be modified by the user terminals 120. For example, the AP 110 may indicate such restrictions in a trigger frame. In one aspect, the AP 110 may specify a target transmission duration for the user terminals 120, and each user terminal 120 may determine their respective UL PPDU durations, data payload size, MCS, and amount of fill data. In another aspect, the AP 110 may specify a target transmission duration and a UL PPDU duration for the user terminals 120, and each user terminal 120 may determine its respective data payload size, MCS, and amount of fill data. In another aspect, the AP 110 may specify a target transmission duration, UL PPDU duration, and MCS for the user terminals 120, and each user terminal 120 may adjust its respective data payload size and amount of fill data.

In some aspects, the user terminals 120 may send information to the AP 110 indicating their respective data payload sizes. In one such aspect, the AP 110 may determine an amount of fill data for each user terminal 120 based on the data payload sizes of the user terminals 120. In the trigger frame, the AP 110 may indicate an amount of fill data to use, a target transmission duration, a UL PPDU duration, and an MCS for each of the user terminals 120. In this aspect, each of the user terminals 120 may determine their data payload size. In another such aspect, the AP 110 may indicate a target transmission duration, a UL PPDU duration, data payload size, MCS, and an amount of fill data for each of the user terminals 120. In another aspect, the AP 110 may indicate a level of data aggregation for each user terminal 120 to use as discussed further discussed below. Accordingly, the user terminals 120 may determine operating and transmission parameter adjustments which are not specified by the AP 110 in the trigger frame. FIGS. 14-22 show examples of changes that user terminals 120 may make to their data for transmission or their operating and transmission parameters in order to satisfy a target transmission duration.

Figure 14:
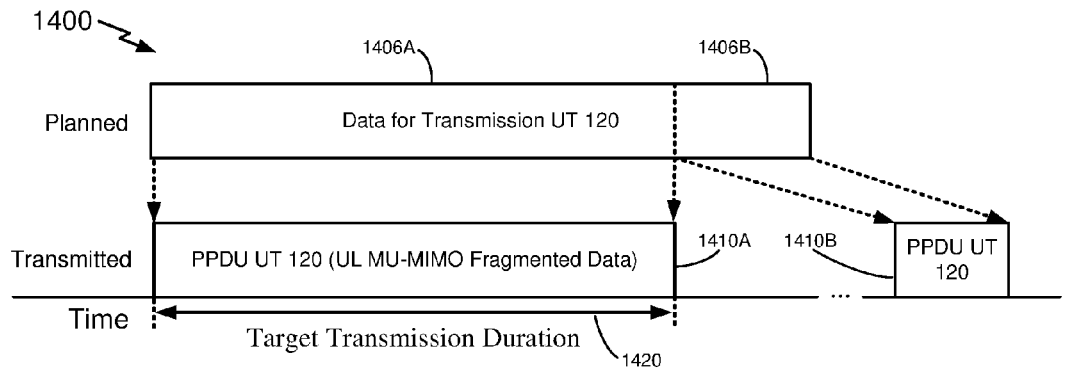
FIG. 14 is a time sequence diagram that shows a user terminal fragmenting its data for transmission to fit a target transmission duration for an uplink multi-user multiple-input multiple-output transmission during a transmission opportunity.

FIG. 14 is a time sequence diagram 1400 that shows a user terminal 120 fragmenting its planned data for transmission to fit a target transmission duration 1420 for a UL-MU-MIMO transmission during a transmission opportunity. The dashed arrows in FIG. 14 indicate that a duration of a first PPDU 1410A as transmitted by the user terminal 120 remains the same as a planned transmission duration of a first portion of the data for transmission 1406A. As described above, an AP 110 may indicate the target transmission duration 1420 in a message (e.g., CTX message) granting a transmission opportunity to the user terminal 120. As shown in FIG. 14, the user terminal 120 may have planned data for transmission 1406 that has a planned transmission duration that exceeds the target transmission duration 1420. The user terminal 120 may modify the planned data 1406 to fit the target transmission duration 1420, for example, by fragmenting the planned data 1406 into a first portion of data 1406A and a second portion of data 1406B. The first PPDU 1410A may include the first portion of data 1406A and, when transmitted by the user terminal 120 according to a UL-MU-MIMO operating mode, has a transmission duration that falls within the target transmission duration 1420. The second portion of data 1406B may be transmitted by the user terminal 120 in a second PPDU 1410B, at a later time (e.g., during a subsequent transmission opportunity). As such, the user terminal 120 may build the first PPDU 1410A such that the length of the PPDU coincides with the target transmission duration indicated by the AP 110.

Figure 15:
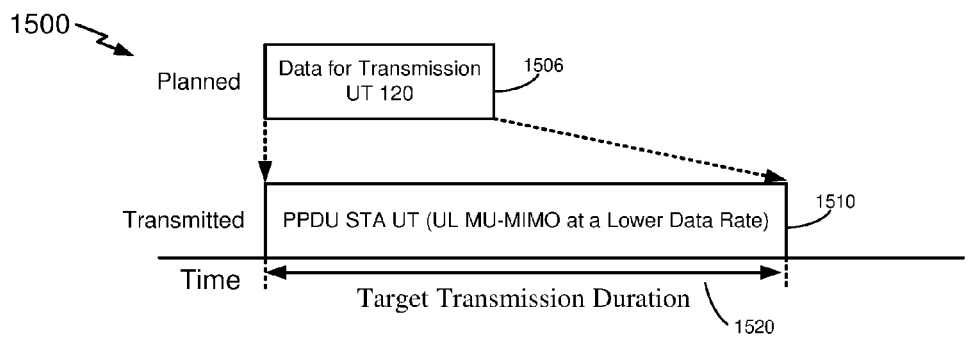
FIG. 15 is a time sequence diagram that shows a user terminal decreasing its transmission data rate to fit a target transmission duration for an uplink multi-user multiple-input multiple-output transmission during a transmission opportunity.

FIG. 15 is a time sequence diagram 1500 that shows a user terminal 120 decreasing its transmission data rate to fit a target transmission duration 1520 for a UL-MU-MIMO transmission during a transmission opportunity. The dashed arrows in FIG. 15 indicate an increase in transmission duration resulting from the user terminal 120 decreasing its planned transmission data rate. As described above, an AP 110 may indicate the target transmission duration 1520 in a message granting a transmission opportunity (e.g., trigger frame or CTX message) to the user terminal 120. As shown in FIG. 15, the user terminal 120 may have planned data for transmission 1506 that, when transmitted according to planned operating and transmission parameters, has a planned transmission duration that falls short of the target transmission duration 1520. Accordingly, the user terminal 120 may modify its operating and transmission parameters to fit the target transmission duration 1520. For example, the user terminal 120 may transmit the data 1506 at a lower data rate to fit the target transmission duration 1520. The user terminal 120 may also adjust a coding scheme and a guard interval for the transmission of uplink data. As described above, the AP 110 may determine and indicate the MCS adjustment for each user terminal 120 by transmitting trigger frames (not shown for simplicity) to the user terminals 120. Alternatively, each user terminal 120 may determine its own MCS adjustment. The data 1506 may be provided in a PPDU 1510 that, when transmitted by the user terminal 120 at the lower data rate according to a UL-MU-MIMO operating mode, has a transmission duration that fits the target transmission duration 1520.

Figure 16:
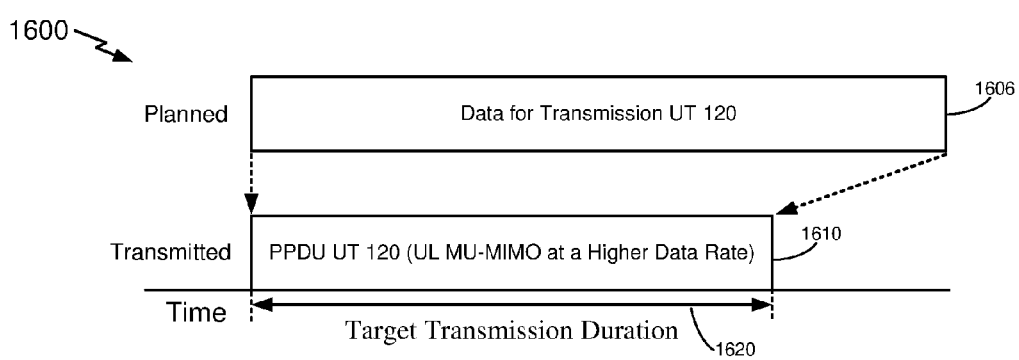
FIG. 16 is a time sequence diagram that shows a user terminal increasing its transmission data rate to fit a target transmission duration for an uplink multi-user multiple-input multiple-output transmission during a transmission opportunity.

FIG. 16 is a time sequence diagram 1600 that shows a user terminal 120 increasing its transmission data rate to fit a target transmission duration 1620 for a UL-MU-MIMO transmission during a transmission opportunity. The dashed arrows in FIG. 16 indicate a decrease in transmission duration resulting from the user terminal 120 increasing the transmission data rate of the data for transmission 1606 to produce the PPDU 1610 as transmitted by the user terminal 120. As described above, an AP 110 may indicate the target transmission duration 1620 in a message (e.g., CTX message) granting a transmission opportunity to the user terminal 120. As shown in FIG. 16, the user terminal 120 may have planned data for transmission 1606 that has a planned transmission duration that exceeds the target transmission duration 1620. The user terminal 120 may transmit the data 105 at a higher data rate to fit the target transmission duration 1520. The user terminal 120 may also adjust a coding scheme and a guard interval for the transmission of uplink data. As described above, the AP 110 may determine and indicate the MCS adjustment for each user terminal 120 by transmitting trigger frames (not shown for simplicity) to the user terminals 120. Alternatively, each user terminal 120 may determine its own MCS adjustment. The data 1606 may be provided in a PPDU 1610 that, when transmitted by the user terminal 120 at the higher data rate according to a UL-MU-MIMO operating mode, has a transmission duration that fits the target transmission duration 1620.

Figure 17:
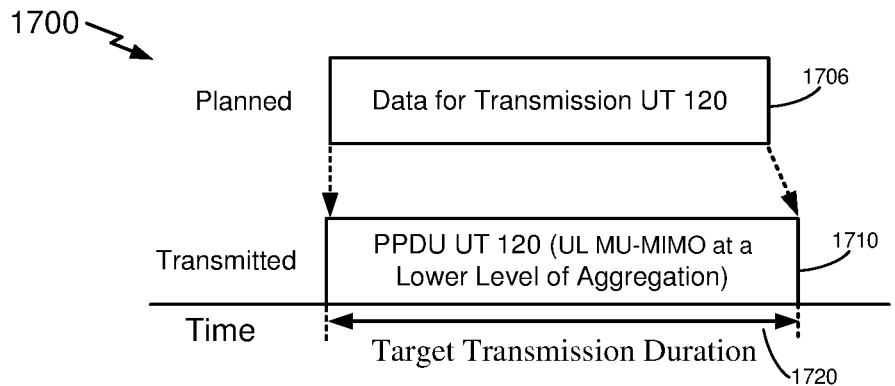
FIG. 17 is a time sequence diagram that shows a user terminal decreasing its level of aggregation to fit a target transmission duration for an uplink multi-user multiple-input multiple-output transmission during a transmission opportunity.

FIG. 17 is a time sequence diagram 1700 that shows a user terminal 120 decreasing its level of aggregation to fit a target transmission duration 1720 for a UL-MU-MIMO transmission during a transmission opportunity. The dashed arrows in FIG. 17 indicate an increase in transmission duration resulting from the user terminal 120 decreasing the level of aggregation for the data for transmission 1706 to produce the PPDU 1710 as transmitted by the user terminal 120. As described above, an AP 110 may indicate the target transmission duration 1720 in a message (e.g., CTX message) granting a transmission opportunity to the user terminal 120. As shown in FIG. 17, the user terminal 120 may have planned data for transmission 1706 that has a planned transmission duration that falls short of the target transmission duration 1720. The user terminal 120 may decrease a level of data aggregation in a media access control (MAC) protocol data unit (A-MPDU) or a level of data aggregation in a MAC service data unit (A-MSDU) to fit the target transmission duration 1720. The AP 110 may determine and indicate the level of aggregation for each user terminal 120 by transmitting trigger frames (not shown for simplicity) to the user terminals 120. Alternatively, each user terminal 120 may determine its own level of aggregation. The data 1706 may be provided in a PPDU 1710 that, when transmitted by the user terminal 120 at the lower level of data aggregation according to a UL-MU-MIMO operating mode, has a transmission duration that fits the target transmission duration 1720.

Figure 18:
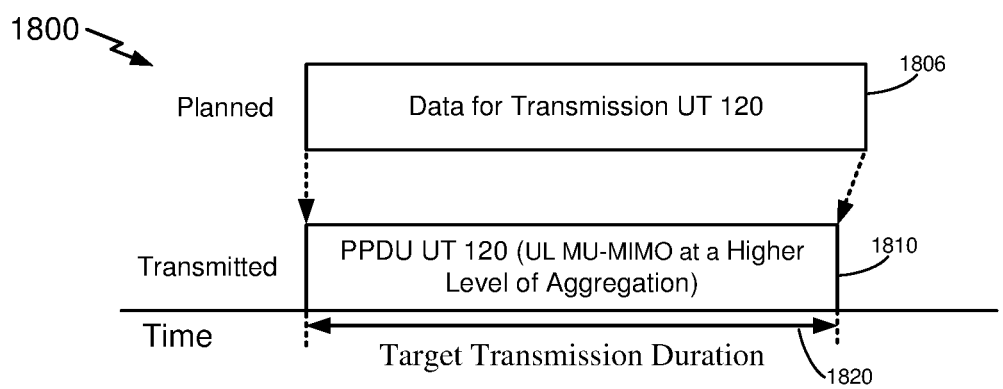
FIG. 18 is a time sequence diagram that shows a user terminal increasing its level of aggregation to fit a target transmission duration for an uplink multi-user multiple-input multiple-output transmission during a transmission opportunity.

FIG. 18 is a time sequence diagram 1800 that shows a user terminal 120 increasing its level of aggregation to fit a target transmission duration 1820 for a UL-MU-MIMO transmission during a transmission opportunity. The dashed arrows in FIG. 18 indicate a decrease in transmission duration resulting from the user terminal 120 increasing the level of aggregation for the planned data for transmission 1806 to produce the PPDU 1810 as transmitted by the user terminal 120. As described above, an AP 110 may indicate the target transmission duration 1820 in a message (e.g., CTX message) granting a transmission opportunity to the user terminal 120. As shown in FIG. 18, the user terminal 120 may have data for transmission 1806 that has a planned transmission duration that exceeds the target transmission duration 1820. The user terminal 120 may increase a level of data aggregation in an A-MPDU or a level of data aggregation in an A-MSDU to fit the target transmission duration 1820. The AP 110 may determine and indicate the level of aggregation for each the user terminal 120 by transmitting trigger frames to the user terminals 120. Alternatively, each user terminal 120 may determine its own level of aggregation. The data 1706 may be provided in a PPDU 1810 that, when transmitted by the user terminal 120 at the higher level of data aggregation according to a UL-MU-MIMO operating mode, has a transmission duration that fits the target transmission duration 1820.

Figure 19:
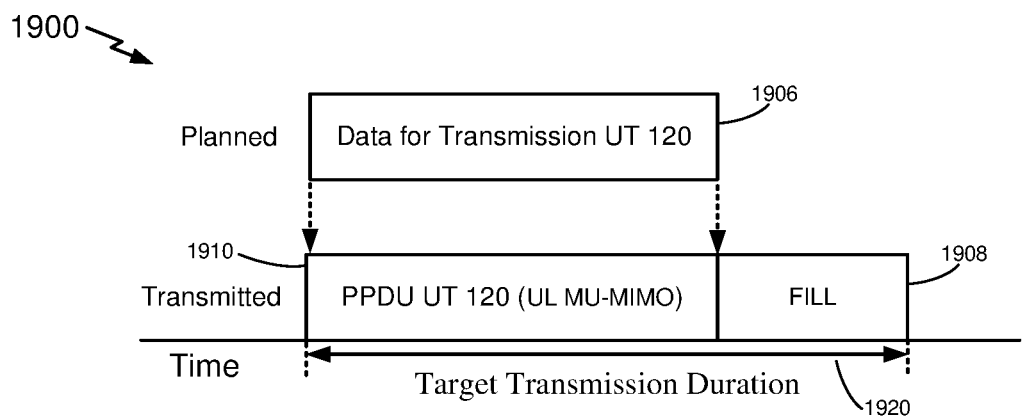
FIG. 19 is a time sequence diagram that shows a user terminal adding fill data 1908 to fit a target transmission duration for an uplink multi-user multiple-input multiple-output transmission during a transmission opportunity.

FIG. 19 is a time sequence diagram 1900 that shows a user terminal 120 adding fill data 1908 to fit a target transmission duration 1920 for a UL-MU-MIMO transmission during a transmission opportunity. The dashed arrows in FIG. 19 indicate that the transmission duration of a PPDU 1910 as transmitted by the user terminal 120 remains the same as the data for transmission 1906, but the fill data 1908. As described above, an AP 110 may indicate the target transmission duration 1920 in a message (e.g., CTX message) granting a transmission opportunity to the user terminal 120. As shown in FIG. 19, the user terminal 120 may have planned data for transmission 1906 that has a planned transmission duration that falls short of the target transmission duration 1920. The user terminal 120 may transmit a PPDU 1910 including base data (e.g., the data for transmission 1906) and may also transmit fill data 1908 according to a UL-MU-MIMO operating mode, during the transmission opportunity, to fit the target transmission duration 1920. The AP 110 may determine and indicate the amount of fill data for each user terminal 120 by transmitting trigger frames to the user terminals 120. Alternatively, each user terminal 120 may determine its own amount of fill data. In other embodiments, the user terminal 120 may transmit the fill data 1908 prior to transmitting the PPDU 1910. The fill data 1908 may include, for example, end of file (EOF) padding delimiters, subframe pad octets, or A-MPDU EOF subframes. The fill data 1908 may also be transmitted before the PPDU 1910. In yet another embodiment, the fill data 1908 may be added to the beginning of an A-MPDU. A combined transmission duration of the PPDU 1910, including the base data and the fill data 1908, may fit the target transmission duration 1920.

Figure 20:
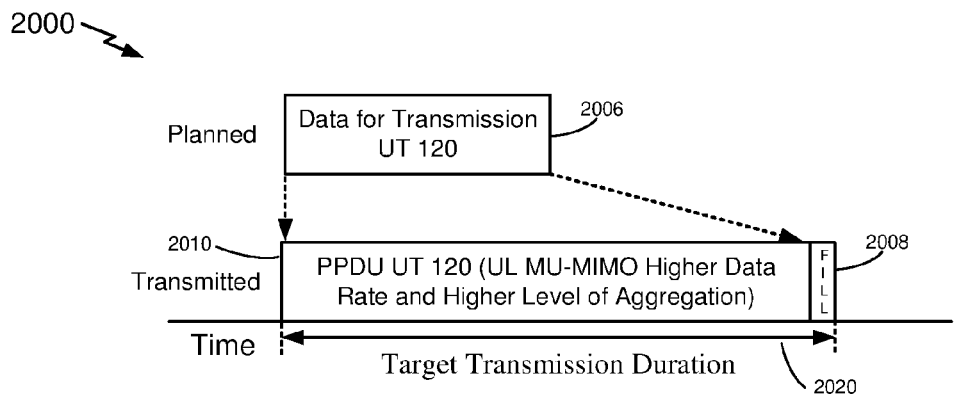
FIG. 20 is a time sequence diagram that shows a user terminal decreasing its transmission data rate, decreasing its level of aggregation, and adding fill data to fit a target transmission duration for an uplink multi-user multiple-input multiple-output transmission during a transmission opportunity.

FIG. 20 is a time sequence diagram 2000 that shows a user terminal 120 decreasing its transmission data rate, decreasing its level of aggregation, and adding fill data 2008 to fit a target transmission duration 2020 for a UL-MU-MIMO transmission during a transmission opportunity. The dashed arrows in FIG. 20 indicate the change in transmission duration resulting from the user terminal 120 increasing the level of aggregation and increasing the data rate for the data for transmission 2006 to produce the PPDU 2010 as transmitted by the user terminal 120. As described above, an AP 110 may indicate the target transmission duration 2020 in a message (e.g., CTX message) granting a transmission opportunity to the user terminal 120. As shown in FIG. 20, the user terminal 120 may have planned data for transmission 2006 that has a planned transmission duration that falls short of the target transmission duration 2020. The user terminal 120 may decrease a level of data aggregation in an A-MPDU or A-MSDU and may transmit the data 2006, with fill data 2008, at a lower data rate (e.g., by adjusting its MCS) to fit the target transmission duration 2020. As discussed above, the AP 110 may determine and indicate the level of data aggregation and the MCS for each user terminal 120 by transmitting trigger frames (not shown for simplicity) to the user terminals 120. Alternatively, each user terminal 120 may determine its own level of data aggregation and MCS. A combined transmission duration of the PPDU 2010 and fill data 2008 may fit the target transmission duration 2020.

Figure 21:
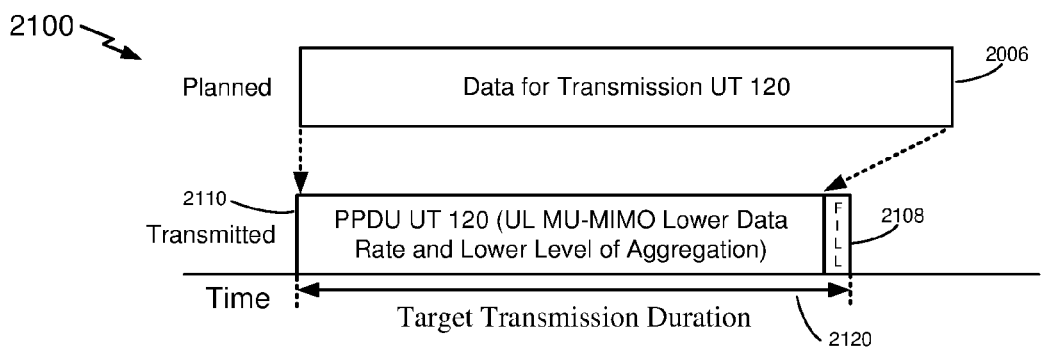
FIG. 21 is a time sequence diagram that shows a user terminal increasing its transmission data rate, increasing its level of aggregation, and adding fill data to fit a target transmission duration for an uplink multi-user multiple-input multiple-output transmission during a transmission opportunity.

FIG. 21 is a time sequence diagram 2100 that shows a user terminal 120 increasing its transmission data rate, increasing its level of aggregation, and adding fill data 2108 to fit a target transmission duration 2120 for a UL-MU-MIMO transmission during a transmission opportunity. The dashed arrows in FIG. 21 indicate the change in transmission duration resulting from the user terminal 120 decreasing the level of aggregation and decreasing the data rate for the data for transmission 2106 to produce the PPDU 2110 as transmitted by the user terminal 120. As described above, an AP 110 may indicate the target transmission duration 2120 in a message (e.g., CTX message) granting a transmission opportunity to the user terminal 120. As shown in FIG. 21, the user terminal 120 may have planned data for transmission 2106 that has a planned transmission duration that exceeds the target transmission duration 2120. The user terminal 120 may increase a level of data aggregation in an A-MPDU or A-MSDU and may transmit the data 2006, with fill data 2008, at a higher data rate (e.g., by adjusting its MCS) to fit the target transmission duration 2120. As discussed above, the AP 110 may determine and indicate the level of data aggregation and the MCS for each user terminal 120 by transmitting trigger frames (not shown for simplicity) to the user terminals 120. Alternatively, each user terminal 120 may determine its own level of data aggregation and MCS. A combined transmission duration of a PPDU 2110, including the data 2106, and the fill data 2008 may fit the target transmission duration 2120.

Figure 22:
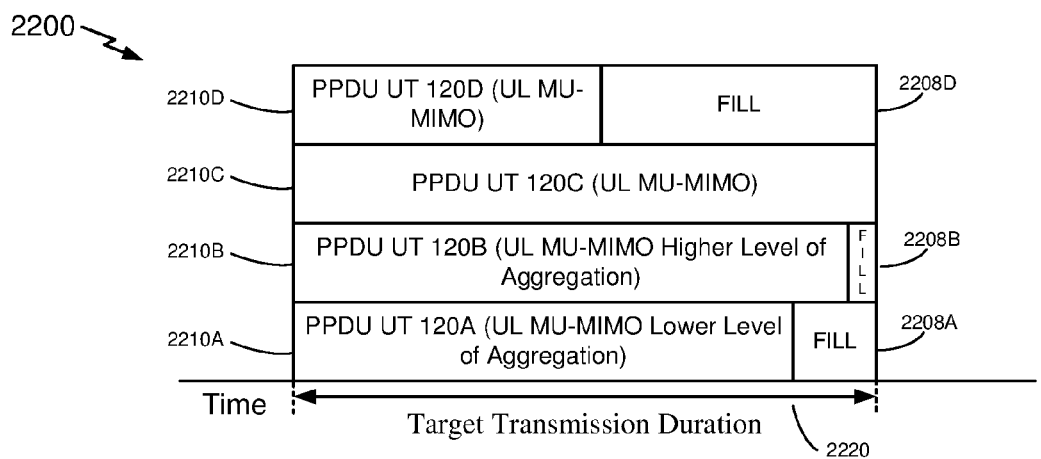
FIG. 22 is a time sequence diagram that shows user terminals concurrently transmitting data during a transmission opportunity for a duration that fits a target transmission duration.

FIG. 22 is a time sequence diagram 2200 that shows user terminals 120A-D concurrently transmitting data during a transmission opportunity for a duration that fits a target transmission duration 2220. As described above, an AP 110 may indicate the target transmission duration 2220 in a message (e.g., CTX message) granting a transmission opportunity to the user terminals 120A-120D. As shown in FIG. 22, the user terminals 120A-120D may transmit data (e.g., a PPDU or fill data) to fit the target transmission duration 2220. The user terminal 120A may decrease a level of data aggregation in an A-MPDU or A-MSDU (e.g., as described above with respect to FIG. 17) and may transmit fill data 2208A and a PPDU 2210A to fit the target transmission duration 2220. The user terminal 120B may increase a level of data aggregation in an A-MPDU or A-MSDU (e.g., as described above with respect to FIG. 18) and may transmit fill data 2208B and a PPDU 2210B to fit the target transmission duration 2220. The user terminal 120C may have data for transmission that fits the target transmission duration 2220 without any modification or changes to a corresponding PPDU 2210C. The user terminal 120D may transmit a PPDU 2210D and fill data 2208D to fit the target transmission duration 2220. In other embodiments, the user terminals 120 may use any combination of the changes in data or operating and transmission parameters shown in FIGS. 14-21 in order to fit the target transmission duration. By maintaining each of the UL-MU-MIMO transmissions (e.g., from user terminals 120A-120D) at the same length, the power level of the transmissions may remain constant, thereby reducing the negative effects of power fluctuations on the receivers.

Figure 23:
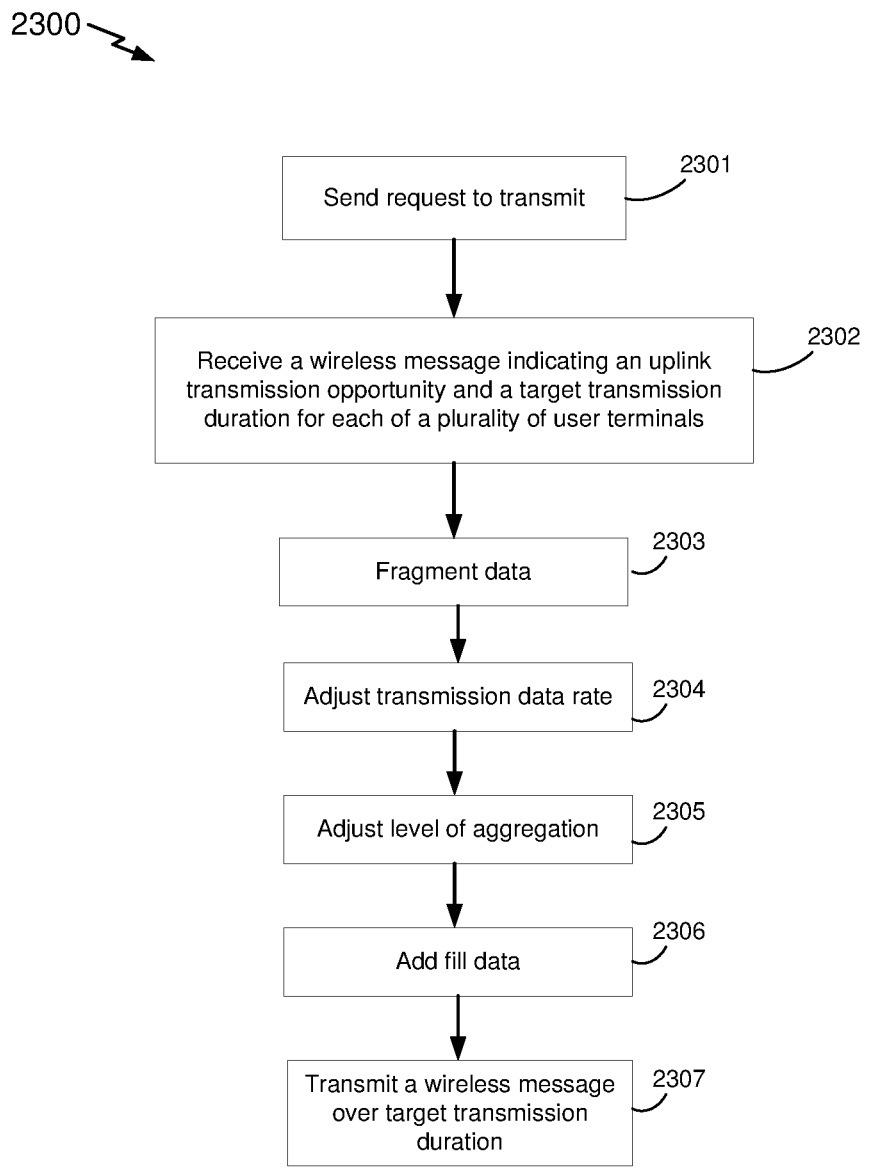
FIG. 23 is a flow chart of a method for changing data for transmission or operating parameters such that a duration of an uplink multi-user multiple-input multiple-output transmission fits a target transmission duration.

FIG. 23 is a flow chart depicting an operation for modifying data and/or operating parameters such that a duration of an UL-MU-MIMO transmission fits a target transmission duration. A user terminal 120 may send a request to transmit (e.g., an RTX) to an AP 110 (2301). The user terminal 120 may receive a wireless message (e.g., CTX) from the AP 110 indicating an uplink transmission opportunity and a target transmission duration for each of a plurality of user terminals 120 (2302).

The user terminal 120 may then fragment the data for transmission (2303). In some aspects, the user terminal 120 may adjust its transmission data rate to fit the target transmission duration (2304). In other aspects, the user terminal 120 may adjust a level of data aggregation to fit the target transmission duration (2305). Still further, the user terminal 120 may add fill data to fit the target transmission duration (2306). Each of the steps 2303, 2304, 2305, and 2306 may be optional. For some embodiments, the user terminal 120 may perform any combination of these steps 2303-2306 to fit the target transmission duration (e.g., as described above with respect to FIGS. 14-21). Finally, the user terminal 120 may transmit a message over the target transmission duration (2307).

In each of the above described embodiments, the user terminals 120 may perform uplink transmissions for the maximum duration indicated by the AP 110. However, in accordance with other embodiments, one or more of the user terminals 120 may transmit UL-MU PPDUs having a duration shorter than the maximum duration indicated by the AP 110. This may allow the user terminals 120 to conserve power and allow other terminals more opportunities to transmit their uplink data (e.g., as described above with respect to FIG. 19).

According to some example embodiments, the AP 110 may transmit a CTX frame indicating at least: (i) which stations are clear to transmit UL MU data, (ii) a starting time for the TXOP, and (iii) an expected maximum duration for the transmission (e.g., in accordance with CTX frames described above with respect to FIGS. 11-13). According to some embodiments, this CTX frame may be preceded by RTS and ACK messages, as described above with respect to FIG. 8. Similarly, with respect to FIG. 8, each of the user terminals 120 targeted by the CTX frame may transmit data to the AP 110 starting at a time indicated by the CTX frame.

In accordance with some example embodiments, one or more of the user terminals 120 may transmit data to the AP 110 for a duration that is less than the requested maximum duration indicated in the AP's CTX message. For some example embodiments (e.g., while operating in accordance with MU-MIMO techniques), each user terminal 120 may transmit data to the AP 110 for a duration that is less than the requested maximum duration. However, in other example embodiments (e.g., while operating in accordance with multi-user OFDMA (MU-OFDMA)), user terminals 120 transmitting in the primary channel may be required to maintain uplink data transmissions for the requested maximum duration. For example, user terminals 120 may transmit data to the AP 110 according to the example embodiments described above with respect to FIGS. 14-22. Additionally, in some embodiments, user terminals 120 requesting an immediate ACK or BA may not end their transmissions before the requested maximum duration has expired.

If a user terminal 120 completes its uplink transmission in less than the requested maximum duration, the user terminal 120 may inform the AP 110 of the expected duration of its transmission. The AP 110 may conserve power and processing resources, for example, by ceasing to decode information received from the user terminal 120. However, if a user terminal 120 completes its uplink transmission early, there is a risk that a legacy station may attempt to access the channel after the uplink transmission has ended but before the AP 110 has sent an ACK message. Accordingly, in some embodiments, a user terminal 120 may include its uplink duration (e.g., the maximum duration requested by the AP 110) in the legacy signal (L-SIG) field of its uplink PPDU. Legacy devices receiving the PPDU may then defer from channel access for the maximum duration requested by the AP 110, even though the user terminal 120 may not be transmitting for the entire duration.

The example embodiments recognize that, allowing responding user terminals 120 to transmit data for a duration less than the maximum duration indicated by the AP 110 may interfere with the timing of ACK messages transmitted by the AP 110 to indicate uplink data was correctly received. Therefore, in accordance with some embodiments, each user terminal 120 may determine the expected duration of its uplink data. This duration may be determined, for example, by estimating the throughput and/or data rate of the communications link between the user terminal 120 and the AP 110, and calculating the time required to transmit the PPDU based on the estimated throughput or data rate.

In accordance with some embodiments, user terminals 120 may indicate the expected durations of their uplink data in uplink PPDUs sent to the AP 110. In some example embodiments, the uplink duration may be included within the legacy signal (L-SIG) field of the PPDU. In other example embodiments, the uplink duration may be included in the high efficiency signal (HE-SIG) A, B, or C fields. In further example embodiments, the uplink duration may be included in a MAC payload of the uplink PPDU, such as in a MAC header, delimiter, or in a new frame. In other example embodiments, the uplink duration may be included as a PHY delimiter added as a data symbol after the end of the data payload of the user terminal data to be transmitted.

In accordance with some other embodiments, the AP 110 may determine the duration of an uplink PPDU from a user terminal 120 based on information contained in the uplink PPDU. For example, the AP 110 may use the A-MPDU data length in the VHT-SIG-B field and the MCS to determine the expected duration. In accordance with some other embodiments, the AP 110 may use an indicated data length (e.g., an A-MPDU data length) in combination with an estimated throughput of the communications link between the user terminal 120 and the AP 110 to determine the expected uplink duration.

In accordance with further example embodiments, a user terminal 120 may include an end of frame (EOF) padding delimiter at the end of an A-MPDU to indicate that the end of the uplink data has been reached. An AP 110 may recognize the EOF padding delimiter, and determine that the user terminal 120 has finished transmitting its uplink data.

In accordance with some example embodiments, when a user terminal 120 is expected to complete its uplink transmission in a duration less than the maximum duration requested by AP 110, the AP 110 may use the expected time duration to adapt its decoding scheme in order to avoid the case where multiple uplink data streams are needed for decoding but one or more of the data streams terminates in less than the requested maximum duration.

When one or more user terminals 120 completes its uplink transmission in a duration less than the maximum duration requested by the AP 110, the timing of the ACK messages transmitted by the AP 110 (e.g., to indicate uplink data was correctly received) may be affected. For example, if all user terminals 120 complete their uplink transmissions in less time than the maximum duration requested by the AP 110, the AP 110 may send ACK messages earlier than if the entire duration had been used. In accordance with some embodiments, the AP 110 may send an ACK or BA (e.g., at least a SIFS time) after the longest uplink transmission time among the user terminals 120. In some examples, the AP 110 may determine the longest transmission time among the user terminals 120 by receiving an indication of the expected uplink duration from each of the user terminals 120. In some other examples, the AP 110 may determine the expected uplink durations of each of the user terminals 120 using information provided in the uplink PPDUs. In further examples, the AP 110 may determine the longest transmission time based on an EOF padding delimiter received from each of the user terminals 120 when the end of their uplink data is reached.

Figure 24:
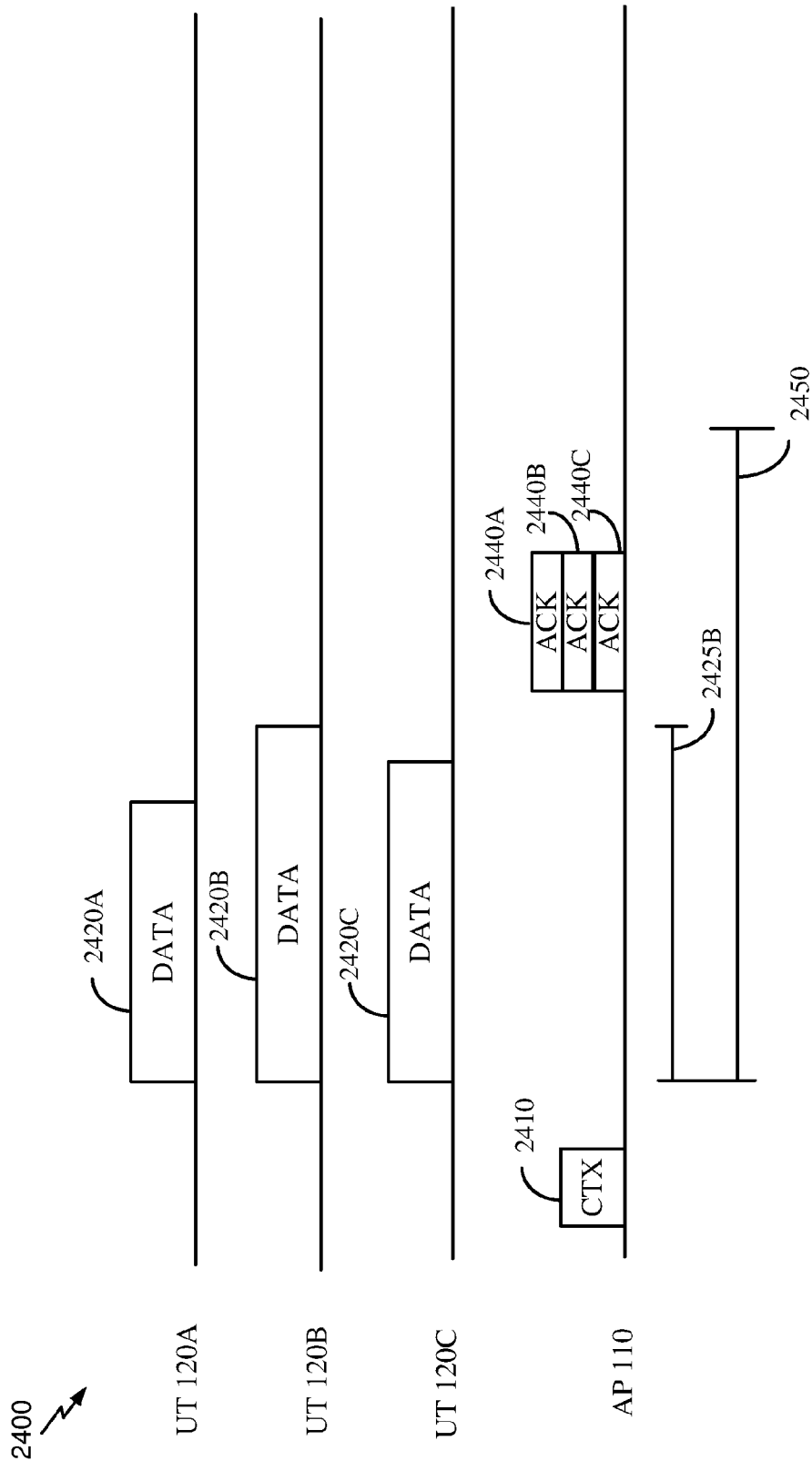
FIG. 24 is a time sequence diagram that shows user terminals concurrently transmitting data during a transmission opportunity, in accordance with some example embodiments.

FIG. 24 depicts a time sequence diagram 2400 showing an example frame exchange, according to some embodiments. AP 110 may send a CTX message 2410 indicating that user terminals 120A, 120B, and 120C are each clear to initiate a respective uplink data transmission having a maximum duration 2450. In response thereto, user terminals 120A, 120B and 120C may transmit uplink data 2420A, 2420B, and 2420C, respectively. Each of the data transmissions 2420A, 2420B, and 2420C has a duration less than the requested maximum duration 2450. Each data transmission may include information indicating its expected duration, when the data transmission is complete, and/or information from which the AP 110 may determine the expected duration (e.g., as described above for some example embodiments). After all data transmissions are complete, AP 110 may send ACK messages 2440A, 2440B, and 2440C to user terminals 120A, 120B, and 120C, respectively. AP 110 may send these ACK messages a SIFS time after the completion of the longest data transmission (e.g., after data transmission 2420B, having a duration 2425B).

In accordance with some other embodiments, the AP 110 may send a termination message a SIFS time after the longest uplink transmission time among the user terminals 120A-120C. The termination message may indicate to the user terminals 120A-120C that all user terminal data has been transmitted, and that the user terminals should expect to receive an ACK or BA message from the AP 110. The AP 110 may then send the ACK or BA messages, either immediately after sending the termination message or at a predetermined time after sending the termination message.

Figure 25:
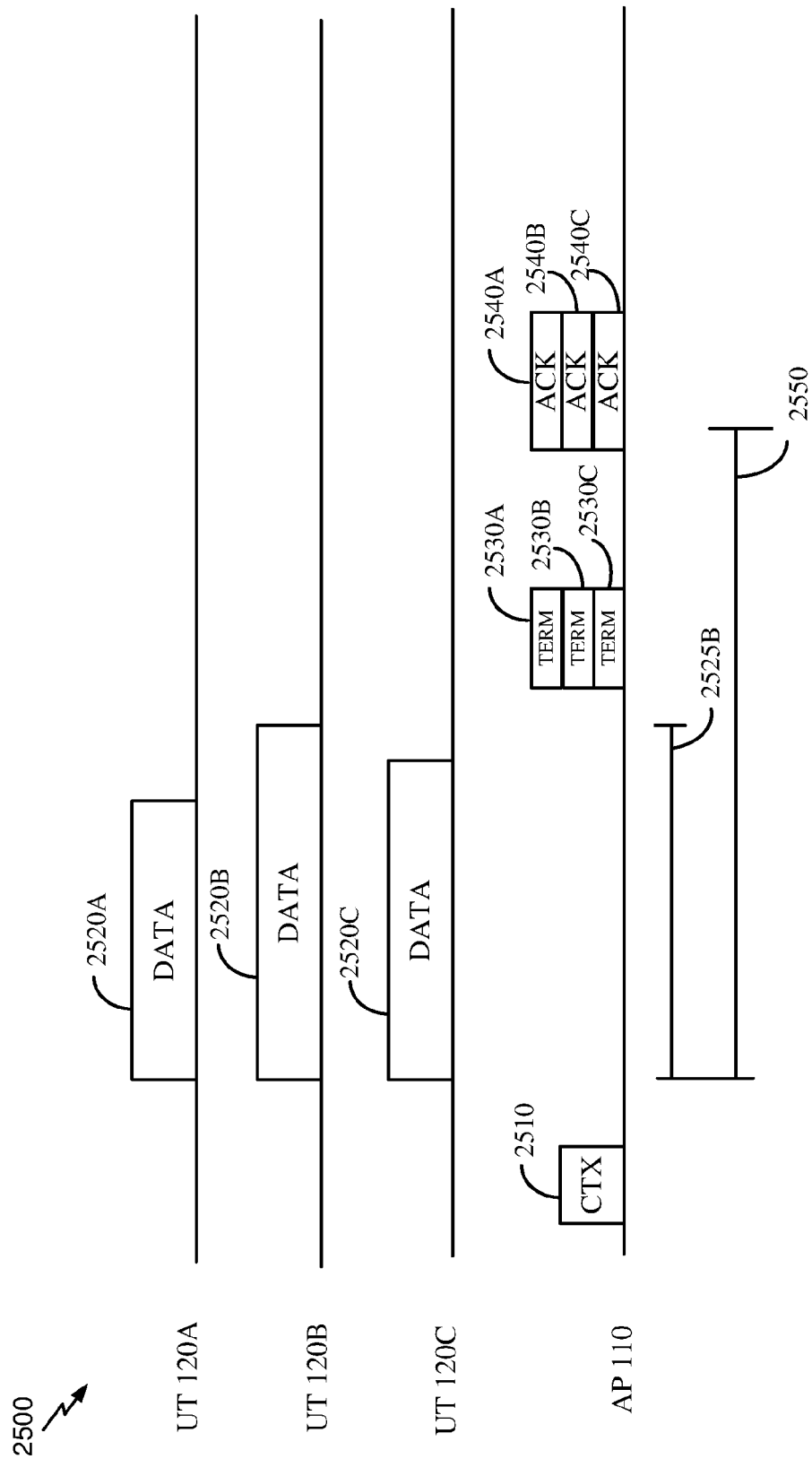
FIG. 25 is a time sequence diagram that shows user terminals concurrently transmitting data during a transmission opportunity, in accordance with some example embodiments.

FIG. 25 depicts a time sequence diagram 2500 showing another example frame exchange, according to some embodiments. AP 110 may send a CTX message 2510 indicating that user terminals 120A, 120B, and 120C are each clear to initiate a data transmission having a maximum duration 2550. In response thereto, UTs 120A, 120B, and 120C may transmit uplink data 2520A, 2520B, and 2520C, respectively. Note that each of the data transmissions 2520A, 2520B, and 2520C has a duration less than the requested maximum duration 2550. Each data transmission may include information indicating its expected duration, when the data transmission is complete, and/or information from which the AP 110 may determine the expected duration (e.g., as described above for some example embodiments). After all data transmissions are complete, AP 110 may send termination messages 2530A, 2530B, and 2530C to user terminals 120A, 120B, and 120C, respectively, indicating that all data transmissions have been completed, and indicating that the user terminals 120A-120C should expect to receive an ACK or a BA message from the AP 110. These termination messages may be sent a SIFS time after the completion of the longest data transmission (e.g., after data transmission 2520B, having a duration 2525B). Finally, at a predetermined time after sending the termination messages, AP 110 sends ACK messages 2540A, 2540B, and 2540C to user terminals 120A, 120B, and 120C, respectively.

For some example embodiments (e.g., while operating in accordance with MU-OFDMA techniques), the AP 110 may send an ACK message only on the channel occupied by the longest user terminal transmission. For some other example embodiments (e.g., while operating in accordance with MU-OFDMA techniques), the AP 110 may send an ACK message on each channel allocated for MU-OFDMA. In some aspects, the AP 110 may verify that one or more channels are idle before transmitting an ACK message on each channel allocated for MU-OFDMA. For example, if a particular user terminal 120 completes its uplink transmission before the longest user terminal transmission, the AP 110 may verify that the channel allocated to the particular user terminal 120 is idle before sending an ACK message.

When a user terminal 120 completes its uplink transmission in less than the maximum duration indicated by the AP 110, the user terminal 120 may enter a sleep mode to conserve power. In accordance with some example embodiments, a user terminal 120 which completes its uplink transmission in less than the maximum duration may send a CTS message to retain control of the channel until the end of the requested duration (e.g., before entering a sleep mode to conserve power). For example, if a user terminal 120 completes its uplink transmissions at a time $t_u$, and the requested duration does not end until a later time $t_r$, then, upon completing its uplink transmissions, the user terminal 120 may send a CTS message for the remaining duration $(t_r - t_u)$, and then enter the sleep mode.

Figure 26:
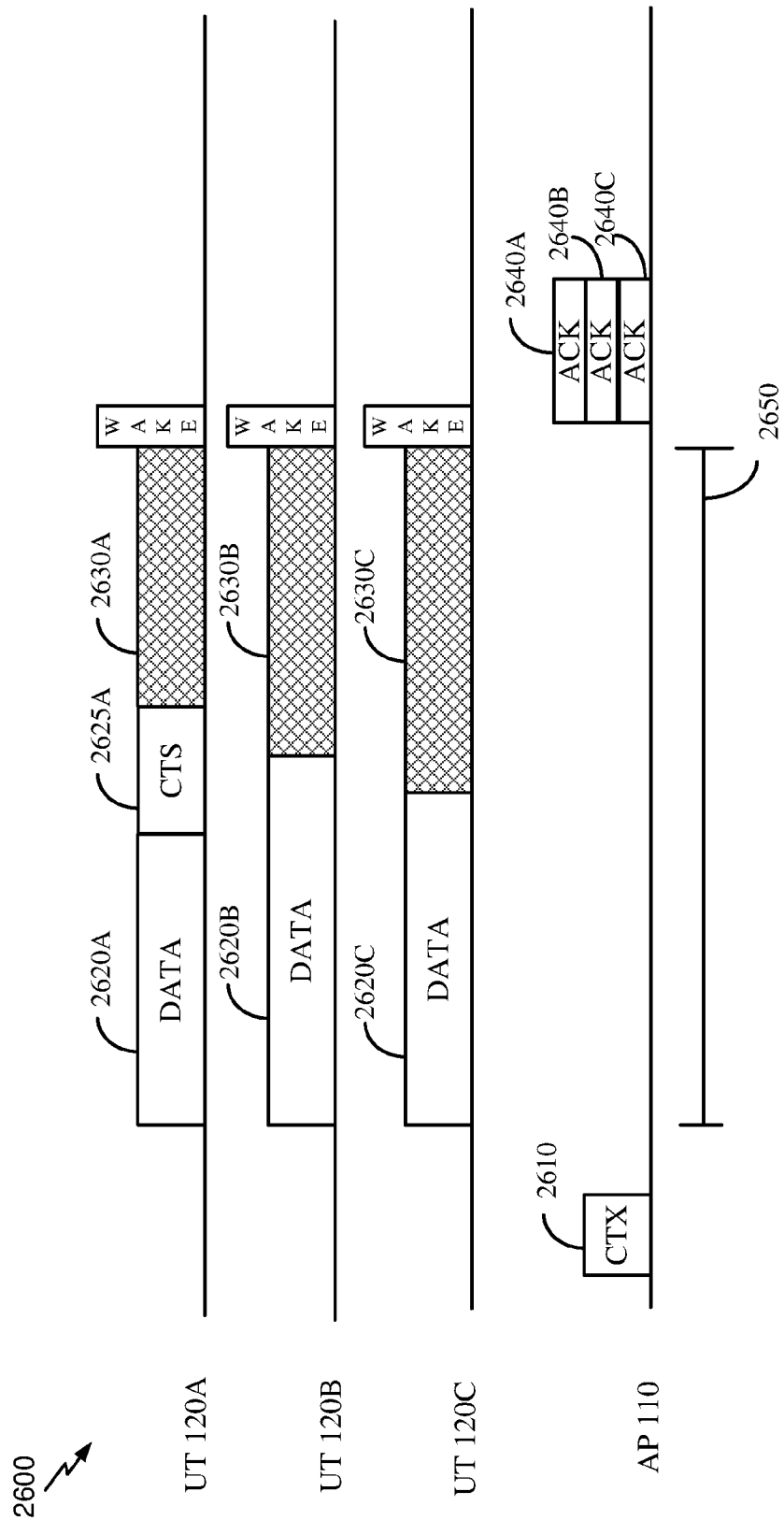
FIG. 26 is a time sequence diagram that shows user terminals concurrently transmitting data during a transmission opportunity, in accordance with some example embodiments.

Sleeping user terminals 120 may not receive ACK messages from the AP 110. Thus, in example embodiments, user terminals 120 may wake periodically or at predetermined time intervals to listen for an ACK from the AP 110. In accordance with some example embodiments, any user terminal 120 that ends its uplink transmissions in less than the maximum duration may enter a sleep mode until the end of the maximum duration, and then wake to listen for ACK messages from the AP 110. An example of such an embodiment is depicted in FIG. 26, with respect to time sequence diagram 2600. In the example of FIG. 26, UTs 120A-120C may complete their respective data uplink transmissions 2620A-2620C in a duration less than a requested maximum duration 2650. UT 120A completes its data transmission first, and may send a CTS message 2625A to retain control of the channel until the end of the requested maximum duration 2650. Then, UT 120A may sleep for a duration 2630A, until the end of the requested maximum duration 2650. Similarly, after UT 120B completes data transmission 2620B, it may sleep for a duration 2630B, and after UT 120C completes data transmission 2620C, it may sleep for a duration 2630C, until the end of the requested maximum duration 2650. Once the maximum duration 2650 has elapsed, UTs 120A-120C may wake and listen for the AP 110 to send ACK messages 2640A-2640C to the UTs 120A-120C, respectively.

In some other example embodiments, the AP 110 and the user terminals 120 may agree on a time interval, such that the AP 110 may only send an ACK message at multiples of the time interval. User terminals 120 that complete their uplink transmissions early may sleep and/or wake at multiples of this time interval to listen for ACK messages from the AP 110. This time interval may be specified, for example, in a CTX message 2610, or in beacon frames transmitted by the AP 110. In some aspects, the time interval may be global for all user terminals 120 associated with the AP 110, or may be determined on an individual basis per user terminal 120.

In further embodiments, the AP 110 may specify in the CTX message 2610 one or more time durations where the AP 110 may potentially send an ACK message if all user terminal transmissions have completed.

Figure 27:
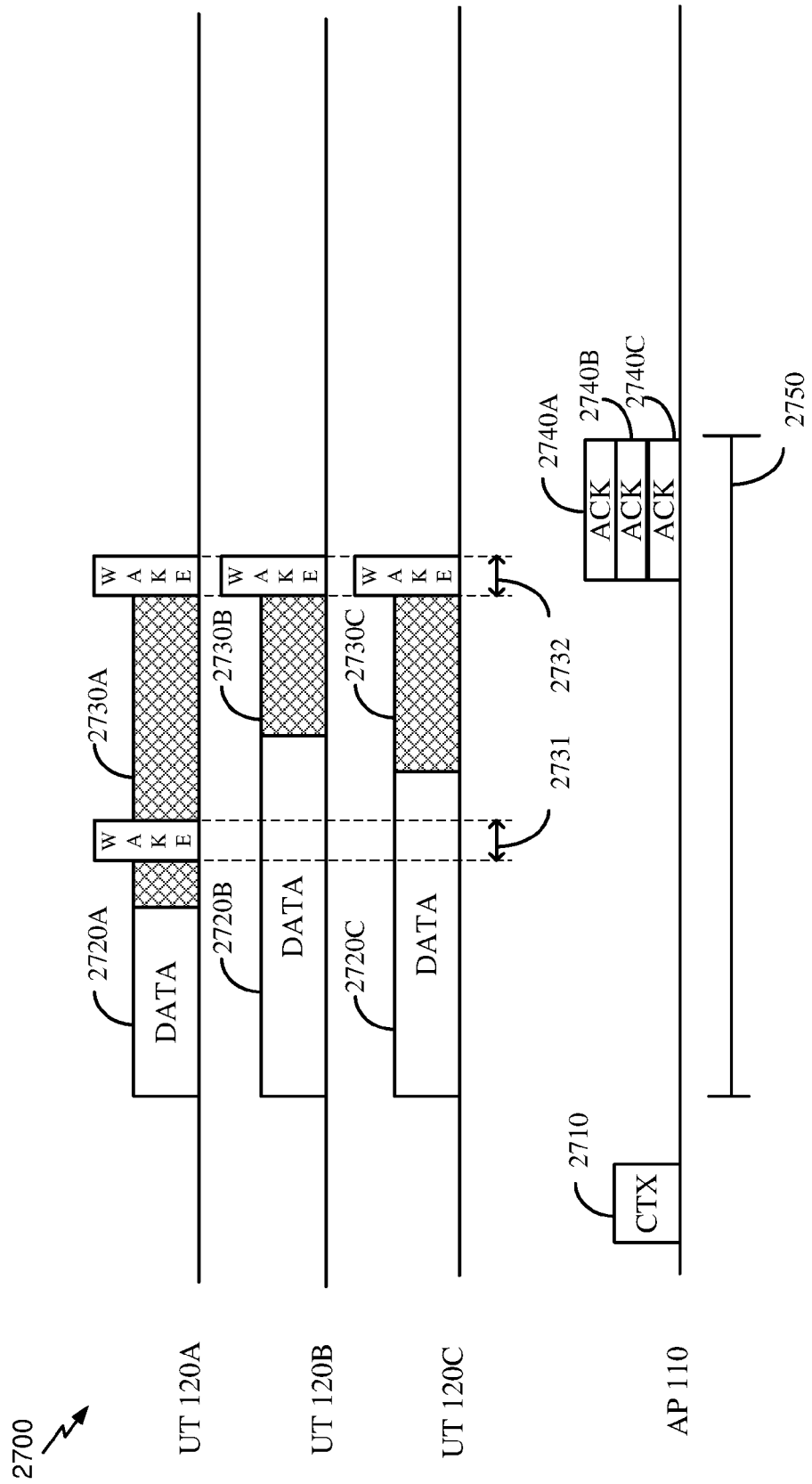
FIG. 27 is a time sequence diagram that shows user terminals concurrently transmitting data during a transmission opportunity, in accordance with some example embodiments.

User terminals that complete their uplink transmissions early may sleep and/or wake to listen for ACK messages at one or more of the specified durations. An example of such an embodiment is depicted in FIG. 27, with respect to time sequence diagram 2700. Note that user terminals 120A-120C complete their respective data transmissions 2720A-2720C in less than a maximum duration 2750. User terminal 120A completes its data transmission first, and may enter a sleep mode for a duration 2730A, and exit the sleep mode at a first predetermined time interval 2731 to listen for an ACK message from AP 110. If no ACK message is received (e.g., user terminal 120B and user terminal 120C are still transmitting respective data 2720B and 2720C during this time interval), user terminal 120A may return to its sleep mode for a second predetermined time interval 2732. When the second predetermined time interval 2732 expires, user terminal 120B and user terminal 120C have completed respective data transmissions 2720B and 2720C and entered a sleep mode for durations 2730B and 2730C, respectively. After the predetermined time interval 2732, user terminals 120A-120C wake and listen for AP 110 to send ACK messages 2740A-2740C.

According to some embodiments, the AP 110 may increase the chance that a sleeping user terminal 120 is able to receive an ACK message by transmitting the ACK message more than once. For example, the AP 110 may repeat a transmitted ACK message at least once, and a user terminal 120 which was sleeping and failed to receive the ACK message during the first transmission is more likely to be awake during at least one of the subsequent transmissions.

According to some embodiments, an AP 110 may select one of the user terminals 120 and require its uplink transmission to have the maximum requested duration, while all other terminals 120 may be allowed to end their uplink transmissions early and go to sleep. Each of the user terminals 120 should be awake at the end of the maximum time duration in order to receive an ACK message from the AP 110.

Figure 28:
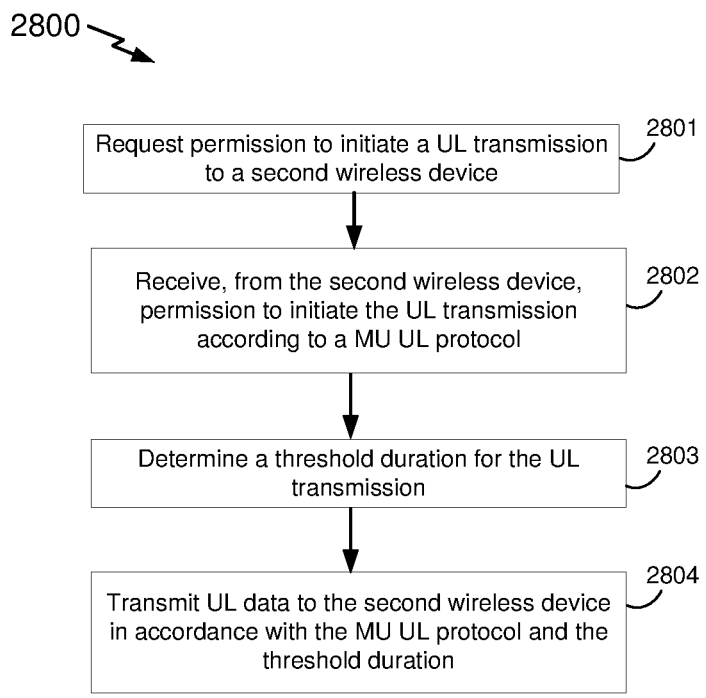
FIG. 28 is a flow chart of an example method for selective multi-user uplink communications.

FIG. 28 shows an illustrative flow chart depicting an example operation 2800 for selective multi-user uplink (UL) communications. Operation 2800 may be performed by a first wireless device, such as any of UTs 120a-120i of FIG. 1, UT 120m or 120x of FIG. 2, a wireless device 302 of FIG. 3, any of UTs 120A-120C of FIG. 8, or 24-27. The first wireless device may request permission to initiate a UL transmission to a second wireless device (2801). In some examples, the second wireless device may be an AP with which the first wireless device is associated. For some embodiments, requesting permission may include sending a request to transmit a message to the second wireless device. The second wireless device may, in some examples, acknowledge reception of the requested permission.

The first wireless device may then receive, from the second wireless device, permission to initiate the UL transmission according to a MU UL protocol (2802). In some examples, the permission to initiate the UL transmission may grant permission to each of a plurality of wireless devices to initiate a respective UL transmission.

The first wireless device may also determine a threshold duration for the UL transmission (2803). The first wireless device may then transmit UL data to the second wireless device in accordance with the MU UL protocol and the threshold duration (2804). In some examples, the threshold duration may equal a duration (or substantially equal, such as a plus or minus tolerance) for transmitting the UL data to the second wireless device. After transmitting the UL data to the second wireless device, the first wireless device may, in some examples, enter a low-power state. For some examples, the first wireless may exit the low-power state at a predetermined time to receive an acknowledgment from the second wireless device.

A person having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof.

What is claimed is:

1. A method for selective multi-user uplink (UL) communications, the method performed by a first wireless device and comprising:
   receiving, from a second wireless device, permission to initiate an UL transmission according to a multi-user (MU) UL protocol;
   determining an expected duration for the UL transmission, and indicating the expected duration to the second wireless device;
   receiving, from the second wireless device, an indication of a maximum duration for transmitting UL data;
   determining that the expected duration for transmitting the UL data to the second wireless device is less than the maximum duration;
   transmitting the UL data to the second wireless device in accordance with the MU UL protocol and the expected duration; and
   after transmitting the UL data to the second wireless device, receiving a termination message from the second wireless device that indicates all UL transmissions have been completed.

2. The method of claim 1, wherein the expected duration is indicated in the UL data within one data field from the group consisting of a legacy signal (L-SIG) field, a high efficiency signal (HE-SIG) A field, an HE-SIG B field, an HE-SIG C field, a media access control (MAC) header, a MAC payload, and a physical layer (PHY) delimiter.

3. The method of claim 1, wherein indicating the expected duration comprises transmitting an end of frame (EOF) delimiter following the UL data to indicate that all of the UL data has been transmitted.

4. The method of claim 1, further comprising receiving an acknowledgment (ACK) from the second wireless device after receiving the termination message and before the maximum duration has elapsed.

5. The method of claim 1, wherein determining the expected duration for the UL transmission comprises calculating, based on an estimated throughput or data rate, a time required to transmit the UL data.

6. The method of claim 1, further comprising, after transmitting the UL data to the second wireless device, sending a message to retain control of a channel used for transmitting the UL data.

7. The method of claim 6, further comprising entering a low power state after transmitting the message to retain control of the channel used for transmitting the UL data.

8. The method of claim 1, further comprising entering a low power state after transmitting the UL data to the second wireless device.

9. A first wireless device, comprising:
   one or more processors;
   one or more transceivers; and
   a memory storing one or more programs comprising instructions that, when executed by the one or more processors, cause the first wireless device to transmit uplink (UL) data to a second wireless device in a selective multi-user UL communication by performing operations comprising:
      receiving, from the second wireless device, permission to initiate a UL transmission according to a multi-user (MU) UL protocol;
      determining an expected duration for the UL transmission and indicating the expected duration to the second wireless device;
      receiving, from the second wireless device, an indication of a maximum duration for transmitting the UL data;
      determining that the expected duration for transmitting the UL data to the second wireless device is less than the maximum duration;
      transmitting the UL data to the second wireless device in accordance with the MU UL protocol and the maximum duration; and
      after transmitting the UL data to the second wireless device, receiving a termination message from the second wireless device that indicates all UL transmissions have been complete.

10. The first wireless device of claim 9, wherein the expected duration is indicated within one data field from the group consisting of a legacy signal (L-SIG) field, a high efficiency signal (HE-SIG) A field, an HE-SIG B field, an HE-SIG C field, a media access control (MAC) header, a MAC payload, and a physical layer (PHY) delimiter.

11. The first wireless device of claim 9, wherein execution of the instructions for indicating the expected duration causes the first wireless device to perform operations further comprising transmitting an end of frame (EOF) delimiter following the UL data to indicate that all of the UL data has been transmitted.

12. The first wireless device of claim 9, wherein execution of the instructions causes the first wireless device to perform operations further comprising receiving an acknowledgment (ACK) from the second wireless device after receiving the termination message and before the maximum duration has elapsed.

13. The first wireless device of claim 9, wherein execution of the instructions causes the first wireless device to perform operations further comprising receiving, from the second wireless device, an indication of one or more durations for receiving an ACK from the second wireless device.

14. The first wireless device of claim 9, wherein execution of the instructions to determine the expected duration for the UL transmission further causes the first wireless device to calculate, based on an estimated throughput or data rate, a time required to transmit the UL data.

15. The first wireless device of claim 9, wherein execution of the instructions further causes the first wireless device to send a message to retain control of a channel used for transmitting the UL data.

16. The first wireless device of claim 15, wherein execution of the instructions further causes the first wireless device to enter a low power state after transmitting the message to retain control of the channel used for transmitting the UL data.

17. The first wireless device of claim 9, wherein execution of the instructions further causes the first wireless device to enter a low power state after transmitting the UL data to the second wireless device.

18. A non-transitory computer-readable storage medium storing one or more programs comprising instructions that, when executed by one or more processors of a first wireless device, cause the first wireless device to transmit uplink (UL) data to a second wireless device in a selective multi-user UL by performing operations comprising:
    receiving, from the second wireless device, permission to initiate a UL transmission according to a multi-user (MU) UL protocol;
    determining an expected duration for the UL transmission and indicating the expected duration to the second wireless device;
    receiving, from the second wireless device, an indication of a maximum duration for transmitting the UL data;
    determining that the expected duration for transmitting the UL data to the second wireless device is less than the maximum duration;
    transmitting the UL data to the second wireless device in accordance with the MU UL protocol and the expected duration; and
    after transmitting the UL data to the second wireless device, receiving a termination message from the second wireless device that indicates all UL transmissions have been completed.

19. The non-transitory computer-readable storage medium of claim 18, wherein execution of the instructions to determine the expected duration for the UL transmission further causes the first wireless device to calculate, based on an estimated throughput or data rate, a time required to transmit the UL data.

* * * * *